(12) United States Patent
Chokkalingam

(10) Patent No.: US 12,506,389 B1
(45) Date of Patent: Dec. 23, 2025

(54) BIDIRECTIONAL ROTOR DEVICE FOR ELECTROMECHANICAL ENERGY CONVERSION AND METHOD THEREOF

(71) Applicant: Ramkumar Chokkalingam, Sunnyvale, CA (US)

(72) Inventor: Ramkumar Chokkalingam, Sunnyvale, CA (US)

(73) Assignee: Ramkumar Chokkalingam, CA (US)

( * ) Notice: Subject to any disclaimer, the term of this patent is extended or adjusted under 35 U.S.C. 154(b) by 0 days.

(21) Appl. No.: 19/181,174

(22) Filed: Apr. 16, 2025

Related U.S. Application Data

(60) Provisional application No. 63/682,834, filed on Aug. 14, 2024.

(51) Int. Cl.
*H02K 7/116* (2006.01)
*F16H 37/04* (2006.01)
(Continued)

(52) U.S. Cl.
CPC ......... *H02K 16/005* (2013.01); *F16H 37/041* (2013.01); *H02K 7/102* (2013.01); *H02K 7/116* (2013.01)

(58) Field of Classification Search
CPC ........ H02K 16/00; H02K 16/005; H02K 7/00; H02K 7/10; H02K 7/11; H02K 7/102;
(Continued)

(56) References Cited

U.S. PATENT DOCUMENTS 7,466,053 B1 * 12/2008 Radev ............... H02K 1/32
310/58
8,253,294 B1    8/2012 Wishart
(Continued)

FOREIGN PATENT DOCUMENTS

| CN | 201830114 U | 5/2011 |
|---|---|---|
| CN | 106369115 A | 2/2017 |

(Continued)

*Primary Examiner* — Tran N Nguyen
(74) *Attorney, Agent, or Firm* — Jason C. Cameron

(57) ABSTRACT

A bidirectional rotor device for electromechanical energy conversion and a method thereof is disclosed. The bidirectional rotor device comprises a first rotor, a second rotor, a plurality of planetary gears, an input actuation unit, and an electric power transferring unit. The first rotor and the second rotor counter-rotate, inducing electromagnetic interactions through strategically placed one of: one or more coils, one or more magnets, and one or more electromagnets enabling efficient power transfer. A braking system regulates rotational speed, enabling hybrid operation as both a motor and a generator. The bidirectional rotor device employs one or more artificial intelligence (AI) models, including load frequency control, droop control, and economic load dispatch, for real-time power optimization, predictive load balancing, and emergency fault detection. The bidirectional rotor device enhances energy efficiency, durability, and adaptability for renewable energy, industrial automation, and electric vehicle applications, providing a versatile and intelligent electromechanical conversion system.

20 Claims, 10 Drawing Sheets

(51) Int. Cl.
*H02K 7/102* (2006.01)
*H02K 16/00* (2006.01)

(58) Field of Classification Search
CPC ......... H02K 7/116; F16H 37/00; F16H 37/04; F16H 37/041
See application file for complete search history.

(56) References Cited

U.S. PATENT DOCUMENTS

| | | |
|---|---|---|
| 2012/0212084 A1 | 8/2012 | Chou |
| 2017/0191203 A1* | 7/2017 | Kim ........................ D06F 37/30 |
| 2023/0283145 A1* | 9/2023 | Duan ..................... H02K 21/24 |
| | | 310/83 |

FOREIGN PATENT DOCUMENTS

| | | | |
|---|---|---|---|
| CN | 206221584 U | 6/2017 | |
| DE | 102006011246 A1 * | 9/2007 | ............ H02K 7/116 |
| IN | 518076 B | 1/2020 | |

* cited by examiner

BIDIRECTIONAL ROTOR DEVICE FOR ELECTROMECHANICAL ENERGY CONVERSION AND METHOD THEREOF

CROSS REFERENCE TO RELATED APPLICATION(S)

This application claims the priority to and incorporates by reference the entire disclosure of U.S. provisional patent application bearing No. 63/682,834 filed on Aug. 14, 2024.

TECHNICAL FIELD

Embodiments of the present disclosure relate to electromechanical energy conversion systems, specifically to bidirectional rotor-based devices that function as both an electric generator and a motor for electromechanical energy conversion.

BACKGROUND

In the field of electromechanical energy conversion systems, conventional electric generators and motors are widely used in power generation, industrial applications, and transportation systems. The electromechanical energy conversion systems typically rely on single-rotor configurations and fixed-speed operations, which pose several challenges in efficiency, adaptability, and performance optimization.

Most traditional electric machines are designed for unidirectional operation, meaning they either function as the generator or as the motor, but not both simultaneously and interchangeably. This leads to inefficiencies in applications requiring dynamic switching between power generation and mechanical output, such as hybrid energy systems, regenerative braking in electric vehicles, and load-adaptive power generation. Additionally, single-rotor systems limit a relative motion between electromagnetic components, restricting an efficiency of electromagnetic induction and reducing power density.

Electric machines typically require complex external controllers to regulate speed and power output under variable load conditions. Many existing electric machines rely on fixed-speed drives, leading to energy losses when operating outside optimal conditions. The electric machines require separate braking mechanisms for motor and generator functions, which increase mechanical wear and system complexity. Further, the electric machines lack real-time adaptive control, leading to inefficiencies when operating under fluctuating power demand.

In conventional designs, torque transfer mechanisms such as direct-drive systems or belt-driven transmissions introduce mechanical losses and inefficiencies. Furthermore, the generators and the motors relying on single-phase electromagnetic interactions fail to maximize energy conversion efficiency, leading to higher power losses and limited output capability.

Modern power systems require intelligent energy management, especially in applications like renewable energy harvesting, electric grids, and autonomous vehicles. However, the modern power systems depend on manual adjustments for load balancing. The modern power systems lack artificial intelligence (AI)-based adaptive control for optimizing efficiency based on real-time conditions. Furthermore, the modern power systems fail to integrate predictive algorithms for load and power regulation, resulting in suboptimal power distribution and higher operational costs.

In the existing technology, a dual rotational electric motor/generator is disclosed. The dual rotational electric motor/generator includes an armature that rotates about a central axis in one direction, a stator that rotates about the central axis in an opposite direction, an axle that extends along the central axis and is secured to the armature, an axle support, a rotational output alignment mechanism for converting the opposite rotations of the armature and stator into a common rotational output direction, and an electrical connection mechanism that supplies functioning electrical communication between the motor/generator and external electrical circuitry while operating the motor/generator. However, the dual rotational electric motor/generator lacks an intelligent control mechanism to dynamically adjust power output and rotational speed based on varying load conditions. This results in energy losses and inefficient power distribution, especially in applications with fluctuating power demand. The dual rotational electric motor/generator relies on fixed-speed control, making it less efficient in optimizing electromagnetic induction at varying rotational speeds.

There are various technical problems with the electromechanical energy conversion systems in the prior art. In the existing technology, a stationary stator restricts the dynamic interaction needed for an optimal energy conversion, resulting in the lower efficiency. A unidirectional design limits adaptability in the applications requiring the bidirectional motion, such as the renewable energy systems. The traditional electric power generators are less efficient in dynamic load applications, as the traditional electric power generators struggle to respond to changing demands quickly and effectively.

Therefore, there is a need for a bidirectional rotor device that addresses traditional electric power generator limitations to enhance the efficiency of the electric power generation.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a bidirectional rotor device for electromechanical energy conversion is disclosed. The bidirectional rotor device comprises a housing unit, a first rotor, a second rotor, a plurality of planetary gears, one of: one or more coils, one or more magnets, and one or more electromagnets, a braking system, and a control unit. The bidirectional rotor device function both as an electric generator and a motor for electromechanical energy conversion.

In an embodiment, the housing unit is configured to house and align at least one of: the first rotor, a sun gear, the second rotor, the plurality of planetary gears, an input actuation unit, and an electric power transferring unit. One of: the sun gear, the second rotor, the plurality of planetary gears, and the pinion gear are configured as one of: a spur gear, a bevel gear, a helical gear, and a double helical gear.

In an embodiment, the first rotor is operatively connected to the sun gear, the input actuation unit, and the electric power transferring unit. The input actuation unit is operatively connected at a first end of the first rotor, configured to drive the first rotor in one of: a clockwise direction and a counterclockwise direction. The input actuation unit comprises one of: a) a mechanical drive system comprises one of: a crankshaft and a belt-driven mechanism, b) an electric motor configured to provide rotational energy to the first rotor, and c) one of: a wind turbine system and a water turbine system for providing rotational energy to the first rotor. The electric power transferring unit is operatively connected at a second end of the first rotor, configured to transfer electric power to external circuits. The electric power transferring unit is operatively connected to the first rotor and the second rotor, configured to transfer the electric power to the external circuits. The electric power transferring unit comprises one of: a) a slip ring assembly for continuous power transmission, and b) a commutator and brush system for converting alternating current (AC) to direct current (DC) power output.

In yet another embodiment, the second rotor comprises inner teeth and outer teeth operatively connected to the electric power transferring unit, operatively positioned concentrically along a longitudinal axis of the first rotor, configured to rotate in a direction opposite to the first rotor. A pinion gear is operatively connected to the outer teeth of the second rotor. The pinion gear is configured to regulate speed variations of the second rotor independent of the plurality of planetary gears and provide additional speed and torque transmission to assist in the generator function. The plurality of planetary gears are operatively positioned between the sun gear and the inner teeth of the second rotor. The plurality of planetary gears are configured to transmit a rotational motion from the sun gear to the second rotor via the inner teeth of the second rotor and provide a counter-rotation between the first rotor and the second rotor.

In yet another embodiment, one of: the one or more coils, the one or more magnets, and the one or more electromagnets are operatively positioned circumferentially on at least one of: the first rotor, inside the second rotor, and a shaft associated with each planetary gear of the plurality of planetary gears. One of: the one or more coils, the one or more magnets, and the one or more electromagnets are configured to generate the electric current through electromagnetic induction as the first rotor and the second rotor rotate relative to each other. One of: the one or more coils, the one or more magnets, and the one or more electromagnets are operatively connected to the electric power transferring unit to: transfer continuous electrical power from one of: the one or more coils, the one or more magnets, and the one or more electromagnets to the external circuits and provide optimal electric power extraction by optimizing the electromagnetic interaction between one of: the first rotor, the second rotor, and the plurality of planetary gears.

In yet another embodiment, the braking system is operatively connected to at least one of the sun gear, the second rotor, and the plurality of planetary gears. The braking system is configured to regulate rotational speed of one of: the sun gear, the second rotor, and the plurality of planetary gears, to avert excessive acceleration. The braking system is configured to trigger a braking force on one of: a) the second rotor for attaining a motor function by rotating the plurality of planetary gears and the sun gear and b) the sun gear for attaining the motor function by rotating the plurality of planetary gears and the second rotor. Further, the braking system is configured to trigger the braking force on the plurality of planetary gears for attaining a generator function by rotating the sun gear and the second rotor through the pinion gear. Furthermore, the braking system is configured to control a bidirectional motion by selectively engaging the braking force on one of: the sun gear, the second rotor, and the plurality of planetary gears, in one of: the clockwise direction and the counterclockwise direction for attaining the electromechanical energy conversion. The braking system comprise at least one of: a mechanical disc, a drum brake, a hydraulic braking mechanism, a pneumatic braking mechanism, and an electromagnetic brake.

In yet another embodiment, the bidirectional rotor device operates in a hybrid mode. In the hybrid mode, the first rotor is configured to generate a mechanical output, and the second rotor is configured to generate the electric power in the motor function. Contrarily, the first rotor is configured to generate the electric power, and the second rotor is configured to generate the mechanical output in the generator function.

In yet another embodiment, the control unit is configured to monitor speed associated with one of the sun gear, the second rotor, and the plurality of planetary gears, load conditions, electric power requirements, energy source variations, application-specific requirements, and braking intensity in real time. The control unit is configured to alter the braking force dynamically based on the monitored speed, the load conditions, electric power requirements, energy source variations, and application-specific requirements. Further, the control unit is configured to trigger the braking force through the braking system for implementing at least one of: a fault detection and an emergency shutdown to avert mechanical failure.

In yet another embodiment, the control unit is configured with one or more artificial intelligence (AI) models to identify load conditions and employ one or more control strategies for the electric power optimization. The one or more AI models comprise at least one of: a) a load frequency control (LFC) model is configured to maintain a stable frequency in the bidirectional rotor device based on regulating a generator output based on the load conditions in real-time, b) a droop control model is configured to stabilize electric power-sharing between multiple energy sources associated with the bidirectional rotor device, c) an economic load dispatch (ELD) model is configured to regulate the braking system to optimize power generation efficiency by adapting energy distribution, d) a unit commitment (UC) model is configured to determine optimal scheduling of the braking system based on at least one of: the load conditions, the electric power requirements, the energy source variations, and the application-specific requirements, e) a load shedding model is configured to avert at least one of: the bidirectional rotor device failure and instability, based on analyzing the load conditions of the bidirectional rotor device, and f) a predictive AI-based load balancing model is configured to forecast energy demand variations and dynamically adapt the operation of the bidirectional rotor device to optimize the electric power generation and the mechanical output.

In accordance with an embodiment of the present disclosure, a method for electromechanical energy conversion using the bidirectional rotor device is disclosed. In the first step, the method includes rotating, by one of: the input actuation unit and the pinion gear, one of: the sun gear associated with the first rotor and the second rotor in one of: the clockwise direction and the counterclockwise direction. In the next step, the method includes transmitting, by the plurality of planetary gears, the rotational motion from the sun gear to the second rotor via inner teeth of the second rotor to provide the counter-rotation between the first rotor and the second rotor.

In the next step, the method includes generating, by one of: the one or more coils, the one or more magnets, and the one or more electromagnets operatively positioned circumferentially on at least one of: the first rotor, inside the second rotor, and the shaft associated with each of planetary gear of the plurality of planetary gears, electric current through electromagnetic induction as the first rotor and the second rotor rotate relative to each other. In the next step, the method includes regulating, by the braking system operatively connected to at least one of the sun gear, the second rotor, and the plurality of planetary gears, rotational speed of one of: the sun gear, the second rotor, and the plurality of planetary gears, to avert excessive acceleration.

In the next step, the method includes trigger the braking force on one of: a) the second rotor for attaining the motor function by rotating the plurality of planetary gears and the sun gear and b) the sun gear for attaining the motor function by rotating the plurality of planetary gears and the second rotor. In the next step, the method includes triggering, by the braking system, the braking force on the plurality of planetary gears to attain the generator function by rotating the sun gear and the second rotor through the pinion gear. In the next step, the method includes controlling, by the braking system, the bidirectional motion by selectively engage the braking force on one of: the sun gear, the second rotor, and the plurality of planetary gears, in one of: the clockwise direction and the counterclockwise direction to attain the electromechanical energy conversion.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limited in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1A:
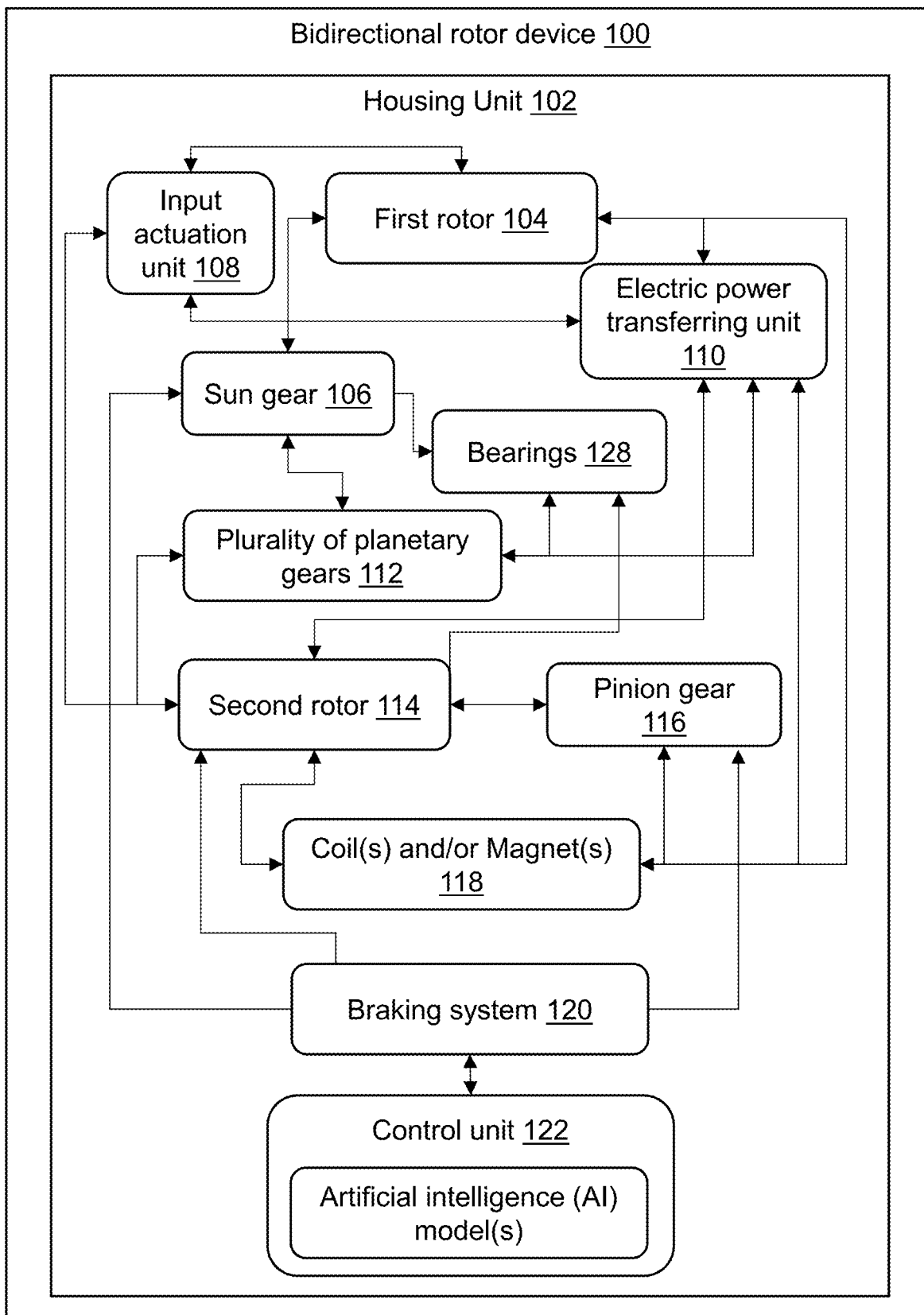
FIG. 1A illustrates an exemplary block diagram depicting a bidirectional rotor device for electromechanical energy conversion, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1A through FIG. 4, where similar reference characters denote corresponding features consistently throughout the figures, there are shown preferred embodiments, and these embodiments are described in the context of the following exemplary system and/or method.

Figure 1B:
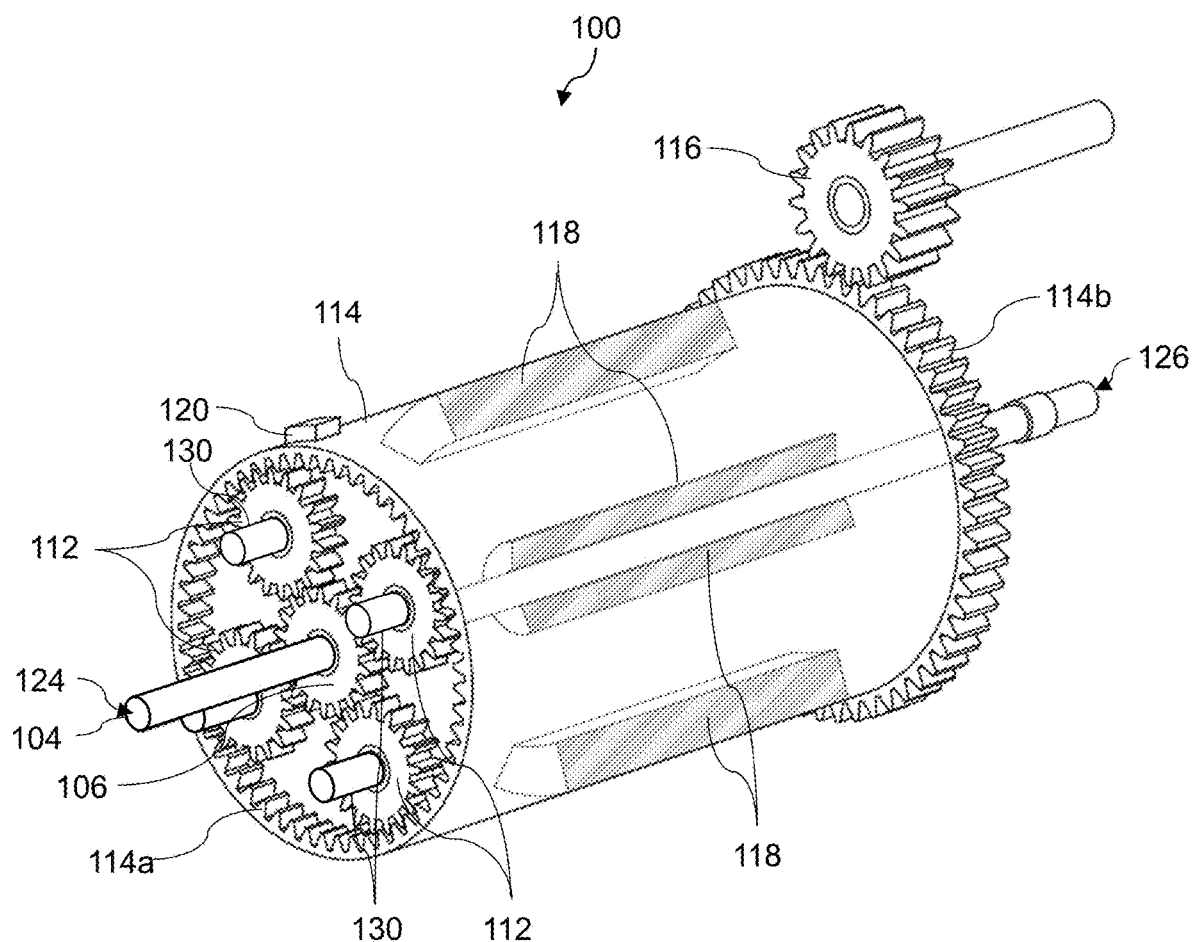
FIG. 1B illustrates an exemplary schematic isometric view of the bidirectional rotor device for electromechanical energy conversion, in accordance with an embodiment of the present disclosure.
Figure 1C:
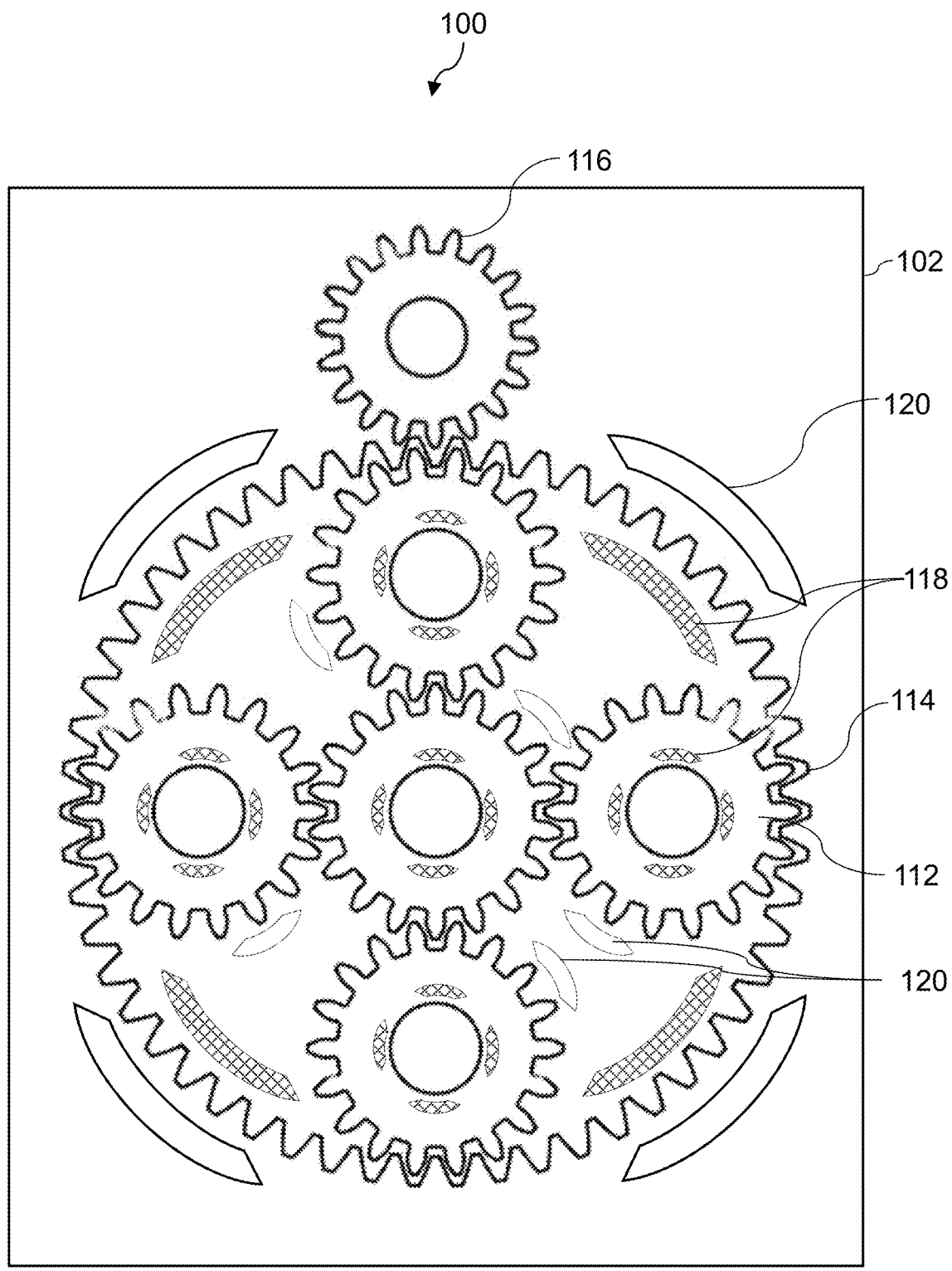
FIG. 1C illustrates an exemplary schematic front view of the bidirectional rotor device for electromechanical energy conversion, in accordance with an embodiment of the present disclosure.
Figure 1D:
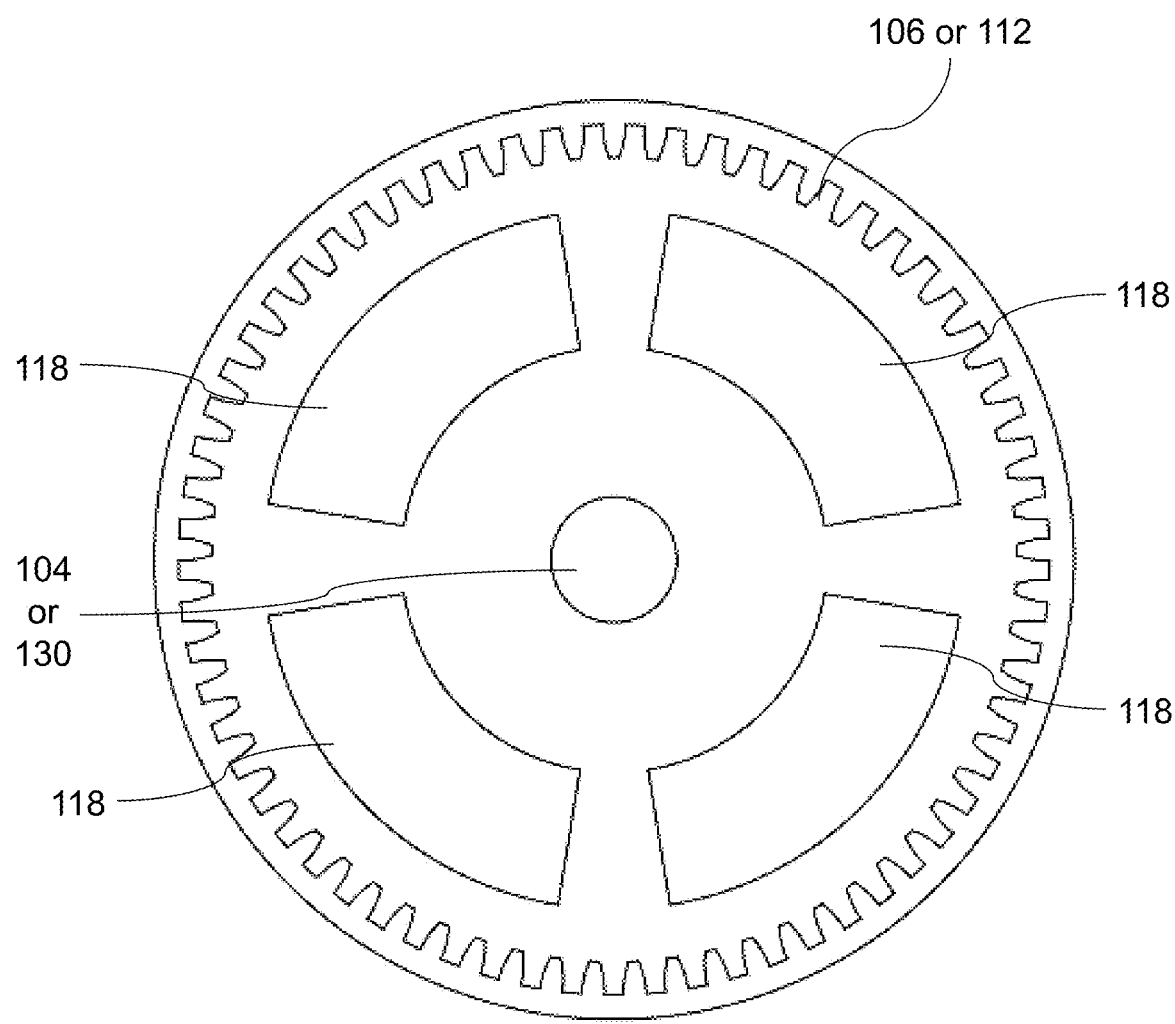
FIG. 1D illustrates an exemplary schematic front view of a first rotor or each planetary gear of a plurality of planetary gears configured with one of: one or more coils, one or more magnets, and one or more electromagnets, in accordance with an embodiment of the present disclosure.

FIG. 1A illustrates an exemplary block diagram depicting a bidirectional rotor device 100 for electromechanical energy conversion, in accordance with an embodiment of the present disclosure;

FIG. 1B illustrates an exemplary schematic isometric view of the bidirectional rotor device 100 for electromechanical energy conversion, in accordance with an embodiment of the present disclosure;

FIG. 1C illustrates an exemplary schematic front view of the bidirectional rotor device 100 for electromechanical energy conversion, in accordance with an embodiment of the present disclosure; and FIG. 1D illustrates an exemplary schematic front view of a first rotor 104 or each planetary gear 112 of a plurality of planetary gears 112 configured with one of: one or more coils, one or more magnets, and one or more electromagnets 118, in accordance with an embodiment of the present disclosure.

According to an exemplary embodiment of the present disclosure, the bidirectional rotor device 100 comprises a housing unit 102, the first rotor 104, a second rotor 114, the plurality of planetary gears 112, one of: the one or more coils, the one or more magnets, and the one or more electromagnets 118, a braking system 120, and a control unit 122. The bidirectional rotor-device 100 that function as both an electric generator and a motor for electromechanical energy conversion.

In an exemplary embodiment, the housing unit 102 is configured to enclose, protect, and provide structural support for at least one of: the first rotor 104, a sun gear 106, the second rotor 114, the plurality of planetary gears 112, an input actuation unit 108, and an electric power transferring unit 110. The housing unit 102 is configured to maintain the positional alignment and operational stability of these components while ensuring minimal mechanical losses due to vibrations, misalignment, or environmental factors. The housing unit 102 is fabricated from high-strength materials, such as, but not limited to, one of: metal alloys, reinforced composites, and thermally conductive materials, depending on operational requirements of the bidirectional rotor device 100. The housing unit 102 is configured to support high-speed rotation of the first rotor 104 and the second rotor 114 while minimizing frictional losses. The housing unit 102 is configured to maintain proper gear meshing and alignment between the sun gear 106 and the plurality of planetary gears 112 to ensure efficient power transmission. The housing unit 102 is configured to facilitate cooling and heat dissipation, particularly in high-load or continuous-operation environments. Further, the housing unit 102 is configured to provide protection against environmental factors, such as dust, moisture, and mechanical impacts, to enhance the durability and longevity of the bidirectional rotor device 100.

In an exemplary embodiment, one of: the sun gear 106, the second rotor 114, the plurality of planetary gears 112, and a pinion gear 116 is configured as, but not limited to, one of: a spur gear, a bevel gear, a helical gear, and a double helical gear, depending on the application requirements. If the sun gear 106, the second rotor 114, and the plurality of planetary gears 112 are configured as spur gears, the teeth are aligned parallel to the axis of rotation. The spur gear configuration provides efficient torque transmission with minimal axial load, making the bidirectional rotor device 100 suitable for applications where high-speed and low-torque transmission is required. The spur gear configuration allows for simple and robust gear meshing, ensuring high mechanical efficiency with low manufacturing complexity.

If the sun gear 106, the second rotor 114, and the plurality of planetary gears 112 are configured as bevel gears, the teeth are oriented at an angle, allowing for power transmission between intersecting shafts. A bevel gear configuration is particularly beneficial when the direction of rotational motion needs to be changed, such as in cases where the input actuation unit 108 requires torque redirection. The bevel gear configuration enables higher torque transmission and is well-suited for applications involving variable-speed operations and dynamic load conditions.

If the sun gear 106, the second rotor 114, and the plurality of planetary gears 112 are configured as helical gears, the teeth are cut at an angle to the axis of rotation, resulting in smoother and quieter operation compared to spur gears. The angled teeth create a gradual engagement between gear teeth, reducing shock loads and ensuring better load distribution across the gear surface. This configuration is particularly advantageous for high-speed and high-torque applications, where minimizing noise and vibration is critical. Additionally, helical gears generate an axial thrust force, which must be managed with appropriate bearing support in the housing unit 102.

If configured as double helical gears, the gears incorporate two helical gear sets with opposing helix angles, effectively canceling out axial thrust forces. This results in higher load-carrying capacity, increased efficiency, and enhanced durability. The double helical gear configuration is particularly well-suited for heavy-duty applications requiring continuous high-power transmission, such as in industrial machinery, aerospace systems, and advanced electromechanical energy conversion systems. The bidirectional rotor device 100 benefits from this design by ensuring stability, reducing wear, and optimizing torque transmission under varying operational conditions.

The selection between the spur gears, the bevel gears, the helical gear, and the double helical gear is dependent on operational constraints, load requirements, and system design specifications to ensure optimal power transmission, mechanical efficiency, and durability. The housing unit 102 is configured to accommodate either configuration while ensuring precise alignment and reliable mechanical engagement between the components.

In an exemplary embodiment, the first rotor 104 is operatively connected to the sun gear 106, the input actuation unit 108, and the electric power transferring unit 110. The first rotor 104 is configured to function as a primary rotating component within the bidirectional rotor device 100, facilitating electromechanical energy conversion by interacting with both mechanical and electrical systems.

The input actuation unit 108 is operatively connected at a first end 124 of the first rotor 104, providing the necessary rotational force to drive the rotor in one of: a clockwise direction or a counterclockwise direction, depending on operational requirements. The input actuation unit 108 is configured to supply rotational energy to the first rotor 104, allowing the input actuation unit 108 to function in motor mode, generator mode, and hybrid mode based on system demands.

The input actuation unit 108 comprises one of the following mechanisms for imparting rotational motion to the first rotor 104. The input actuation unit 108 comprises a mechanical drive system. The mechanical drive system is configured to provide the rotational force through either: a crankshaft mechanism, which transfers mechanical energy from an external power source to the first rotor 104, ensuring direct rotational motion and a belt-driven mechanism, where rotational force is transmitted using a pulley-belt system, allowing for flexible speed adjustments and controlled torque distribution to the first rotor 104.

Further, the input actuation unit 108 comprises an electric motor, which is configured to provide rotational energy to the first rotor 104 by converting electrical energy into mechanical motion, enabling precise speed and torque control. The electric motor may be directly coupled to the first rotor 104 or connected through an intermediate gear transmission system to optimize power delivery.

Furthermore, the input actuation unit 108 comprises one of: a wind turbine system and a water turbine system, where the first rotor 104 is driven by energy derived from a fluid medium such as air or water. In a wind turbine system, airflow impinges on turbine blades, converting kinetic energy into rotational motion, which is then transferred to the first rotor 104. In a water turbine system, fluid pressure or flow velocity is used to rotate the turbine, thereby imparting the rotational motion to the first rotor 104.

At a second end 126, the first rotor 104 is operatively connected to the electric power transferring unit 110, which is responsible for extracting and delivering electrical power to external circuits. The electric power transferring unit 110 is operatively connected to the first rotor 104 and the second rotor 114, configured to transfer the electric power to the external circuits. The electric power transferring unit 110 is configured to ensure efficient transmission of electrical energy, enabling continuous operation while minimizing losses due to electrical resistance or mechanical wear. The electric power transferring unit 110 comprises one of, but not limited to, a slip ring assembly, a commutator and brush system, and the like, to facilitate energy transfer. The slip ring assembly, which enables continuous power transmission from the rotating first rotor 104 to external circuits. The slip ring assembly consists of rotating conductive rings and stationary brushes, allowing electrical signals or power to pass through without restricting the motion of the first rotor 104. The slip ring assembly configuration is ideal for alternating current (AC) power applications, where uninterrupted power transfer is required. Further, the commutator and brush system, which is configured to convert alternating current (AC) generated within the first rotor 104 into direct current (DC) output. The commutator is a segmented cylindrical component attached to the first rotor 104, making contact with carbon or metallic brushes to rectify the alternating current. The commutator and brush system is commonly used in DC motor and generator applications, where a steady DC output is required for powering external loads.

The first rotor 104 and the second rotor 114, in combination with the input actuation unit 108 and the electric power transferring unit 110, enables seamless energy conversion between mechanical and electrical forms, allowing the bidirectional rotor device 100 to operate efficiently in various industrial, automotive, and renewable energy applications.

In an exemplary embodiment, the second rotor 114 comprises inner teeth 114a and outer teeth 114b, and operatively connected to the electric power transferring unit 110. The second rotor 114 is operatively positioned concentrically along a longitudinal axis of the first rotor 104. The second rotor 114 is configured to rotate in a direction opposite to the first rotor 104, facilitating relative motion between the two rotors for efficient electromechanical energy conversion. The counter-rotation enhances electromagnetic induction efficiency, allowing for optimized power generation and mechanical torque distribution.

In the illustrative embodiment, the second rotor 114 is functions as a ring gear in a planetary gear system, where it engages with multiple gears to achieve controlled rotational motion. The second rotor 114, in combination with the planetary gear arrangement, plays a critical role in speed modulation, torque transmission, and mechanical energy balancing within the bidirectional rotor device 100.

The pinion gear 116 is operatively connected to the outer teeth 114b of the second rotor 114. The pinion gear 116 is configured to regulate speed variations of the second rotor 114 independent of the plurality of planetary gears 112. This independent speed regulation allows the second rotor 114 to adapt rotational speed dynamically, based on load conditions and operational requirements. The pinion gear 116 further enhances system performance by providing additional speed and torque transmission, particularly in generator mode, where efficient energy conversion is required.

The plurality of planetary gears 112 are operatively positioned between the sun gear 106 and the inner teeth 114a of the second rotor 114. The plurality of planetary gears 112 are configured to transmit a rotational motion from the sun gear 106 to the second rotor 114 via the inner teeth 114a of the second rotor 114, ensuring efficient torque distribution. The plurality of planetary gears 112 are configured to provide smooth and controlled power transfer between the first rotor 104 and the second rotor 114. The plurality of planetary gears 112 are configured to enable counter-rotation between the first rotor 104 and the second rotor 114, thereby optimizing the electromagnetic induction process for enhanced electric power generation. The plurality of planetary gears 112 are configured to dynamically adjust torque and rotational speed, allowing for precise speed regulation in response to real-time load variations. The interaction between the sun gear 106, the plurality of planetary gears 112, the second rotor 114, and the pinion gear 116 ensures seamless power flow and adaptive speed control, contributing to high-efficiency electromechanical energy conversion.

In an exemplary embodiment, the second rotor 114, the plurality of planetary gears 112, the sun gear 106, and the pinion gear 116 are manufactured using high-strength and wear-resistant materials to ensure durability and long operational life under varying mechanical loads. The second rotor 114, the plurality of planetary gears 112, the sun gear 106, and the pinion gear 116 are made of material selected from a group comprises one of: alloy steel (e.g., AISI 4140, AISI 4340, or case-hardened steel), carbon steel (e.g., AISI 1050, AISI 1065), hardened stainless steel (e.g., 17-4 PH, 440C), titanium alloy (e.g., Ti-6Al-4V), and the like. The second rotor 114, the plurality of planetary gears 112, the sun gear 106, and the pinion gear 116 may be manufactured utilizing one or more manufacturing processes: (a) precision machining techniques, including, but not limited to, computer numerical control (CNC) machining, gear hobbing, and grinding, to ensure high dimensional accuracy and optimal gear meshing; (b) heat treatment processes, such as case hardening, nitriding, and induction hardening, to enhance surface hardness and wear resistance; and (c) surface coating applications, such as PVD (Physical Vapor Deposition), DLC (Diamond-Like Carbon), or phosphate coatings, to minimize friction and improve corrosion resistance.

In an exemplary embodiment, the load-carrying capacity and performance of the second rotor 114, the plurality of planetary gears 112, the sun gear 106, and the pinion gear 116 are determined based on: (a) Torque Transmission Limits: The planetary gear system is configured to withstand high torque loads without experiencing excessive wear or deformation. Load ratings are calculated in accordance with standards established by the American Gear Manufacturers Association (AGMA) and the International Organization for Standardization (ISO); (b) Rotational Speed Limits: The second rotor 114 and the plurality of planetary gears 112 are configured for high-speed operation, incorporating optimized lubrication channels to minimize frictional heat; (c) Thermal Expansion Compensation: The configuration accounts for material expansion resulting from high-speed rotation and heat generation, ensuring continued precision in gear engagement; and (d) Lubrication and Cooling: Integrated lubrication systems, such as oil bath lubrication or forced oil circulation, are employed to facilitate smooth gear operation and minimize wear over time.

In an exemplary embodiment, the second rotor 114, the plurality of planetary gears 112, the sun gear 106, and the pinion gear 116 are supported by high-precision bearings 128. The high-precision bearings 128 are selected from a group comprises, but not limited to, at least one of: tapered roller bearings, ceramic hybrid bearings, self-lubricating bearings, and the like. The tapered roller bearings are configured to manage combined radial and axial loads, ensuring stability under high torque conditions. The ceramic hybrid bearings are configured to reduce friction and longer service life in high-speed applications. The self-lubricating bearings configured to minimize maintenance requirements and enhance operational longevity. Additionally, vibration damping mechanisms are incorporated in the bidirectional rotor device 100 to: (a) reduce gear meshing noise and harmonic vibrations, (b) enhance overall mechanical efficiency, and (c) prevent mechanical fatigue and component misalignment. The second rotor 114, in conjunction with the plurality of planetary gears 112, the pinion gear 116, and the sun gear 106, provides a high-efficiency mechanical transmission system capable of dynamic speed adjustment, torque balancing, and bidirectional rotation control. The combination of high-strength materials, precision manufacturing techniques, and adaptive speed regulation ensures that the system operates with minimal energy losses, reduced wear, and extended durability.

In an exemplary embodiment, the one of: the one or more coils, the one or more magnets, and the one or more electromagnets 118 are operatively positioned circumferentially on at least one of: the first rotor 104, inside the second rotor 114, and a shaft 130 associated with each of planetary gear 112 of the plurality of planetary gears 112. In the illustrative embodiment as depicted in FIG. 1B, the bidirectional rotor device 100 is configured with one of: the one or more coils, the one or more magnets, and the one or more electromagnets 118 on the first rotor 104 and inside the second rotor 114. The strategic positioning of one of: the one or more coils, the one or more magnets, and the one or more electromagnets 118 enables efficient electromagnetic interaction, allowing for optimized electric power generation through electromagnetic induction.

As the first rotor 104 and the second rotor 114 rotate relative to each other, a changing magnetic field is induced across one of: the one or more coils, the one or more magnets, and the one or more electromagnets 118 arrangement, leading to the generation of the electric power. This configuration ensures continuous energy conversion, maximizing the system's efficiency by leveraging the relative motion of the counter-rotating rotors. One of: the one or more coils, the one or more magnets, and the one or more electromagnets 118 are arranged to provide optimal flux linkage, ensuring high electromagnetic coupling and minimal energy loss during power generation.

One of: the one or more coils, the one or more magnets, and the one or more electromagnets 118 is operatively connected to the electric power transferring unit 110, which facilitates the extraction and delivery of generated electrical power to external circuits. The electric power transferring unit 110 is configured to: transfer continuous electrical power from one of: the one or more coils, the one or more magnets, and the one or more electromagnets 118 to external electrical circuits, provide optimal electric power extraction by optimizing the electromagnetic interaction between one of: the first rotor 104, the second rotor 114, and the plurality of planetary gears 112, and minimize electrical losses due to resistance and inductive reactance.

The selection of materials for one of: the one or more coils, the one or more magnets, and the one or more electromagnets 118 is crucial to ensure high power output, minimal losses, and operational longevity. The one or more coils are made from at least one of, but not limited to, high-conductivity copper (e.g., ETP Copper, C11000), aluminum windings (e.g., 1350-O Aluminum), Litz wire construction, insulation material, and the like. The high-conductivity copper is configured to provide low electrical resistance, improving efficiency by reducing $I^2R$ losses. The aluminum windings used in applications where weight reduction is a priority while maintaining good electrical conductivity. The Litz wire construction reduces skin effect losses, ensuring high-frequency efficiency. The insulation material windings are coated with polyimide (Kapton), polyester-imide, or enameled varnish to withstand elevated temperatures and electrical stress.

The one or more magnets, and the one or more electromagnets 118 are selected based on high magnetic strength, thermal stability, and resistance to demagnetization. The one or more magnets 118 are selected from a group comprises one of, but not limited to, neodymium iron boron (NdFeB, N52 Grade or higher), samarium cobalt (SmCo 2:17), ferrite magnets (Hard Ferrite, Ceramic 8), and the like. The neodymium iron boron is configured to provide high magnetic field strength, improving electromagnetic induction efficiency. The samarium cobalt is configured to provide high-temperature resistance up to 350° C., ensuring reliability in high-load and continuous-operation environments. The ferrite magnets used for cost-effective applications where moderate magnetic strength is acceptable.

To enhance durability and corrosion resistance, the one or more magnets 118 are coated with one of: but not limited to, Nickel-Copper-Nickel (Ni—Cu—Ni) plating, Epoxy resin coating, and the like. The Ni—Cu—Ni plating is configured to provide high corrosion resistance and wear protection.

The Epoxy resin coating is configured to avert surface degradation in high-humidity or chemically reactive environments.

Further, one of: the one or more coils, the one or more magnets, and the one or more electromagnets 118 are manufactured using precision processes to ensure high performance and consistency. Coil manufacturing may involve automated CNC winding for precise coil geometry, improving flux linkage for efficient power generation; vacuum impregnation to enhance insulation integrity, mitigating the risk of partial discharge failures under high voltage conditions; and cryogenic treatment of copper windings to reduce electrical resistance and enhance conductivity. Magnet manufacturing may utilize powder metallurgy processes for NdFeB and SmCo magnets, ensuring high-density and a uniform grain structure for enhanced magnetic performance. Sintering and heat treatment may be employed to achieve high coercivity and maximum energy product. Precision grinding and surface polishing may be implemented to ensure tight dimensional tolerances for optimal air gap control between one of: the one or more coils, the one or more magnets, and the one or more electromagnets 118.

In an exemplary embodiment, the bidirectional rotor device 100 is configured to manage variable loads without performance degradation. The placement of one of: the one or more coils, the one or more magnets, and the one or more electromagnets 118 ensures uniform magnetic flux density to prevent hot spots and saturation effects. Heat dissipation is managed through one of: but not limited to, air cooling, liquid cooling, phase-change thermal management, and the like. The air cooling is provided through one of: natural convection and forced air circulation. The liquid cooling is provided through dielectric coolant for high-power applications. The phase-change thermal management is managed using thermal interface materials. The bidirectional rotor device 100 integrates dynamic voltage regulation circuitry to ensure stable power output across different operating speeds and load conditions.

One of: the one or more coils, the one or more magnets, and the one or more electromagnets 118 are mechanically secured to withstand high-speed operation, vibrational forces, and thermal expansion. Precision mounting techniques, such as, but not limited to, one of: adhesive bonding, mechanical fasteners, and magnet retaining sleeves, are used to ensure secure attachment to the first rotor 104, the second rotor 114, and the shaft 130 associated with each of the planetary gear 112 of the plurality of planetary gears 112. The bidirectional rotor device 100 provides maximum efficiency in electromagnetic coupling while preventing excessive eddy current losses. Further, the electromagnetic assembly is configured to withstand high dynamic loads without misalignment or demagnetization.

In an exemplary embodiment, the braking system 120 is operatively connected to at least one of the sun gear 106, the second rotor 114, and the plurality of planetary gears 112. The braking system 120 is configured to regulate rotational speed of one of: the sun gear 106, the second rotor 114, and the plurality of planetary gears 112, to avert excessive acceleration and maintain the bidirectional rotor device stability. By applying controlled braking force, the braking system 120 ensures safe and efficient operation of the electromechanical energy conversion process, preventing mechanical failures due to overspeed conditions.

The braking system 120 is further configured to trigger a braking force on the second rotor 114, for attaining a motor function by enabling the rotation of the plurality of planetary gears 112 and the sun gear 106. The braking system 120 is configured to trigger the braking force on the sun gear 106, for attaining the motor function by facilitating the rotation of the plurality of planetary gears 112 and the second rotor 114. Furthermore, the braking system 120 is configured to trigger the braking force on the plurality of planetary gears 112 for attaining a generator function, wherein the rotational motion of the sun gear 106 and the second rotor 114 is regulated through the pinion gear 116. This configuration enables efficient energy conversion, ensuring that the bidirectional rotor device 100 is able to dynamically switch between motor and generator operations based on external load conditions and power demand.

Additionally, the braking system 120 is configured to control bidirectional motion by selectively engaging the braking force on one of: the sun gear 106, the second rotor 114, and the plurality of planetary gears 112, in one of: the clockwise direction and the counterclockwise direction for attaining the electromechanical energy conversion. This feature allows the bidirectional rotor device 100 to adapt to changing operational requirements, ensuring smooth torque transitions, regenerative braking, and dynamic load adjustment.

The braking system 120 comprises, but not limited to, at least one of: a mechanical disc, a drum brake, a hydraulic braking mechanism, a pneumatic braking mechanism, and an electromagnetic brake. The mechanical disc uses a rotating disc attached to the rotor or gear assembly, with brake pads pressing against the disc to generate frictional force. The mechanical disc provides precise speed control, effective in high-speed applications with minimal wear. The mechanical disc made from hardened steel alloys (AlSl 52100, 440C stainless steel) or ceramic composites to withstand high rotational loads. The drum brake composed of a cylindrical drum that rotates with the braking component, with brake shoes pressing against an inner surface to create friction. The drum brake effective in moderate-speed applications requiring high braking torque. The drum brake made from, but not limited to, one of: cast iron, aluminum alloy, and reinforced composites for enhanced thermal resistance and durability. The hydraulic braking mechanism utilize hydraulic fluid pressure to actuate pistons, pressing brake pads against a disc or drum. The hydraulic braking mechanism provides high braking efficiency with smooth engagement and load balancing. Hydraulic cylinders and seals, constructed from corrosion-resistant materials such as, but not limited to, one of: stainless steel, bronze, and Polytetrafluoroethylene (PTFE)-coated aluminum, are configured to withstand high-pressure operating conditions. The pneumatic braking mechanisms operate using compressed air to apply braking force, commonly employed in industrial and heavy-duty applications. The pneumatic braking mechanism ensures a quick braking response with minimal mechanical wear. Components in the pneumatic braking mechanism includes air-actuated brake chambers, reinforced hoses, and pressure-regulated control valves, engineered for long-term reliability across varying temperature conditions. The electromagnetic brake function by generating a magnetic field that induces resistance, slowing down rotational motion without direct mechanical contact. The electromagnetic brake approach minimizes wear and tear, making it ideal for precision speed control and regenerative braking applications. The electromagnetic brake typically incorporate ferromagnetic core materials, such as, but not limited to, one of: silicon steel laminations, and high-temperature-resistant electromagnets, including Neodymium, Ferrite, or Samarium-Cobalt magnets, for efficient energy dissipation.

The braking system 120 is configured to manage high rotational speeds and varying torque loads, ensuring consistent braking force and thermal stability. The braking system 120 is configured to withstand high braking torques (up to several thousand Nm), depending on the bidirectional rotor device 100 size and application. The braking system 120 incorporates at least one of, but not limited to, heat sinks, cooling fins, and forced air circulation to prevent overheating and brake fade. The bidirectional rotor device 100 automatically modulates braking force based on real-time speed and load conditions, preventing excessive mechanical stress. The braking system 120 may include automatic wear compensation to maintain consistent braking performance over extended operational periods.

In an exemplary embodiment, the braking system 120 components are manufactured utilizing high-strength, wear-resistant materials to ensure durability and reliability under high-speed and high-load operating conditions. The manufacturing of the braking system 120 components comprise as follows: Precision CNC machining is employed for the production of the brake discs, the brake drums, and calipers, ensuring high dimensional accuracy and a smooth surface finish. Powder metallurgy techniques are utilized to produce high-performance sintered brake pads with controlled porosity for effective heat dissipation. Vacuum impregnation and coating processes enhance corrosion resistance in hydraulic braking components. Laser hardening is applied to improve the surface durability of brake discs, extending their lifespan under repeated braking cycles.

In an exemplary embodiment, the control unit 122 is configured to monitor, analyze, and regulate the operational parameters of the bidirectional rotor device 100 in real-time to ensure optimal electromechanical energy conversion and system stability. The control unit 122 continuously tracks and evaluates speed parameters, load conditions, electric power requirements, energy source variations, application-specific demands, and braking intensity to optimize performance and prevent mechanical failures. The control unit 122 is operatively connected to at least one of: (a) the sun gear 106, to track and regulate its rotational speed, ensuring proper engagement with the plurality of planetary gears 112, (b) the second rotor 114, to monitor its counter-rotational movement relative to the first rotor 104, ensuring efficient torque transmission and electromagnetic induction, (c) the plurality of planetary gears 112, to determine the load distribution and power transmission efficiency across the gear system.

The control unit 122 processes real-time data to dynamically adjust the braking force applied through the braking system 120. These adjustments are made based on a variety of factors, including: (a) speed variations observed across the sun gear 106, the second rotor 114, and the plurality of planetary gears 112, ensuring rotational stability; (b) load conditions to prevent overloading or excessive mechanical strain on critical components; (c) electric power requirements, ensuring the bidirectional rotor device 100 generates or consumes the precise amount of power necessary for operation; (d) energy source variations, enabling the bidirectional rotor device 100 to adapt to fluctuations in mechanical input, such as those encountered in wind or water turbine systems; and (e) application-specific requirements, allowing for braking adjustments based on the operating mode, such as, but not limited to, one of: power generation, regenerative braking, motor drive applications, and the like.

The control unit 122 is configured to dynamically alter the braking force applied by the braking system 120 in response to real-time data from one or more sensors embedded in the bidirectional rotor device 100. The one or more sensors comprises at least one of: speed sensors, position sensors, load sensors, torque sensors, electrical sensors, thermal sensors, vibration detection sensors, fault detection sensors, braking system sensors, environmental sensors, and the like. The rotational speed and position sensors, which include rotary encoders, tachometers, and magnetic pickup sensors. The rotary encoder provides precise feedback on the angular position and rotational speed of the first rotor 104 and the second rotor 114, allowing for fine-tuned speed regulation and torque balancing. The tachometer (either contact or non-contact) measures RPM (revolutions per minute) to ensure the bidirectional rotor device 100 operates within safe speed limits. Additionally, the magnetic pickup sensors detect the motion of gears and provide real-time rotational feedback, ensuring accurate synchronization between the plurality of planetary gears 112, the sun gear 106, and the pinion gear 116.

For load and torque measurement, the bidirectional rotor device 100 may use strain gauge load cells, torque sensors, and Hall-effect sensors. The strain gauge load cell detects mechanical stress and deformation in key components, ensuring that the bidirectional rotor device 100 does not exceed structural load limits. The torque sensors measure the twisting force exerted on the rotors and gears, helping to regulate power transmission efficiency. The Hall-effect sensors are used to measure magnetic field variations and provide feedback on rotor positioning and speed, ensuring precise electromagnetic interactions for optimal power generation and conversion.

The electrical power output of the bidirectional rotor device 100 is monitored using current sensors, voltage sensors, and power meters. A current transformer (CT) sensor detects alternating current (AC) flow, ensuring stable power transmission. A Hall-effect current sensor measures direct current (DC) flow, making it useful for applications involving power rectification and storage. A power meter (wattmeter) calculates real-time power output and efficiency, allowing the control unit 122 to adjust the operational parameters for optimal energy conversion.

To ensure thermal management and braking system 120 performance, the bidirectional rotor device 100 may incorporate the temperature sensors, infrared (IR) sensors, and pressure sensors. The temperature sensors (such as thermocouples or Real Time Digital Simulator (RTDs)) monitor heat buildup in one of: the one or more coils, the one or more magnets, and the one or more electromagnets 118, and braking components, preventing overheating and thermal degradation. The Infrared (IR) sensors provide non-contact thermal monitoring, allowing for real-time temperature tracking without physical interference. The pressure sensors are integrated into hydraulic and pneumatic braking mechanisms, ensuring precise control of braking force and preventing brake failure due to pressure imbalances.

Additionally, for the vibration and fault detection, the bidirectional rotor device 100 may utilize accelerometers and gyroscopic sensors. The accelerometer detects vibrations and mechanical oscillations, allowing the control unit 122 to compensate for imbalances or mechanical misalignments. The gyroscopic sensor measures rotational stability, ensuring that the first rotor 104 and the second rotor 114 maintain proper counter-rotation without excessive mechanical drift.

In an exemplary embodiment, the control unit 122 is configured to trigger the braking force through the braking system 120 for implementing at least one of: a fault detection and an emergency shutdown to avert mechanical failure. The control unit 122 continuously monitors the bidirectional rotor device 100 health and detects anomalous conditions such as, but not limited to, at least one of: excessive vibration, overheating, irregular speed variations, and sensor malfunctions. If an anomaly is detected, the control unit 122 directs a braking command to halt the bidirectional rotor device 100 operation safely. The control unit 122 generates diagnostic alerts, allowing for preventive maintenance before a catastrophic failure occurs. In the event of critical failure conditions such as, but not limited to, at least one of: overloading beyond structural capacity, uncontrolled rotor acceleration, sudden power loss or electrical short circuits, hydraulic or pneumatic system failures, and the like, the control unit 122 executes an emergency braking command. The emergency braking command is configured to engage full braking force to halt all rotational motion immediately, isolate the electric power transferring unit 110 to prevent electrical damage, and shut down non-essential subsystems to reduce energy consumption. The emergency shutdown mechanism ensures maximum safety and prevents irreversible mechanical damage, making the system highly dependable for continuous industrial or renewable energy applications.

The control unit 122 incorporates high-performance electronic components configured for real-time monitoring and control. The control unit 122 is embedded with a high-speed microcontroller, potentially utilizing architectures such as Advanced RISC Machine (ARM) Cortex-M series, Digital Signal Processing (DSP), or Field-Programmable Gate Arrays (FPGAs), to facilitate real-time data processing and dynamic braking adjustments. The bidirectional rotor device 100 integrates one or more artificial intelligence (AI) models, including predictive load management capabilities that analyze historical data and real-time inputs to anticipate load variations, adaptive speed control mechanisms that adjust rotor speed in response to external mechanical or electrical inputs, and fault detection neural networks that identify anomalous behaviors and recommend preventive maintenance actions.

The control unit 122 is configured with the one or more AI models to identify load conditions and employ one or more control strategies for the electric power optimization. The integration of the one or more AI models enables real-time decision-making, ensuring that the bidirectional rotor device 100 operates with maximum efficiency, stability, and adaptability under varying load and power conditions. The one or more AI models comprise, but not limited to, at least one of: a) a load frequency control (LFC) model, a droop control model, an economic load dispatch (ELD) model, a unit commitment (UC) model, a load shedding model, a predictive AI-based load balancing model, and the like.

The load frequency control (LFC) model is configured to maintain a stable frequency in the bidirectional rotor device 100 by dynamically regulating generator output based on real-time load conditions. The LFC model continuously monitors frequency deviations in the power output. The LFC model is configured to adjust generator torque and rotational speed of the first rotor 104 and the second rotor 114 to restore frequency stability. The LFC model is configured to avert power fluctuations and instability, ensuring seamless integration with external electrical grids. The LFC model relies on high-speed digital signal processing (DSP) microcontrollers and AI-based adaptive controllers, fabricated using low-power CMOS (complementary metal-oxide-semiconductor) technology for efficient real-time processing.

The droop control model is configured to stabilize electric power-sharing between multiple energy sources associated with the bidirectional rotor device 100. The droop control model enables: (a) distributed power management, ensuring optimal load-sharing among connected energy sources such as wind turbines, batteries, and grid systems, (b) voltage and frequency regulation based on system demand, and (c) prevention of overloading in hybrid energy systems by adjusting rotor speed, braking intensity, and power output. The droop control model is implemented using high-performance AI processing units with deep learning-based pattern recognition to adapt dynamically to changing power conditions. The hardware components are thermal-resistant with gold-plated contact points to prevent signal degradation over extended use.

The ELD model is configured to regulate the braking system 120 to optimize power generation efficiency by dynamically adapting energy distribution based on cost-efficient power allocation. The ELD model enables dynamic load balancing to ensure optimal energy conversion with minimal energy losses, selective engagement of braking force, reducing unnecessary power dissipation in the generator mode, and real-time cost optimization, selecting the most energy-efficient operating mode for the bidirectional rotor device 100. The ELD model operates using AI-powered multi-objective optimization models, leveraging reinforcement learning techniques to ensure high-efficiency power management. The control circuits for ELD model are built using silicon carbide (SiC) power electronics, which provide high thermal stability and fast switching speeds.

The UC model is configured to determine the optimal scheduling of the braking system 120 based on at least one of: a) the load conditions, ensuring that braking force is applied only when necessary, b) the electric power requirements, dynamically adjusting braking intensity to regulate output power, c) the energy source variations, allowing smooth transitions between motor mode and generator mode, d) the application-specific requirements, ensuring customized braking schedules for industrial, renewable energy, or transportation applications. The UC model integrates AI-based predictive analytics using neural network controllers, allowing autonomous system calibration based on historical operational data. The control unit 122 uses low-latency Field Programmable Gate Array (FPGA)-based AI accelerators to process real-time braking and scheduling data efficiently.

The load-shedding model is configured to avert failure and instability in the bidirectional rotor device 100 by analyzing the real-time load conditions. The load-shedding model is configured to detect overload conditions and dynamically reduces power output to prevent overheating and mechanical stress. The load-shedding model is configured to isolate non-essential subsystems during power shortages, ensuring that critical operations continue without disruption. The load-shedding model is configured to avert grid instability by reducing the reactive power load, stabilizing overall system performance. The load shedding system is implemented using high-speed AI controllers with event-driven neural network architectures, configured to instantly respond to emergency power fluctuations. The hardware components use graphene-based heat sinks to ensure efficient thermal management and extended operational lifespan.

The predictive AI-based load balancing model is configured to forecast energy demand variations and dynamically adapt the operation of the bidirectional rotor device 100 to optimize both electric power generation and mechanical output. The predictive AI-based load balancing model uses machine learning procedures to anticipate power demand fluctuations based on historical trends and real-time sensor data. The predictive AI-based load balancing model dynamically adjusts braking intensity, rotor speed, and generator torque to match energy production with demand. The predictive AI-based load balancing model averts overloading and unnecessary braking, improving system lifespan and efficiency. The predictive AI-based load balancing model operates using AI-driven computational fluid dynamics (CFD) simulations, optimizing power generation in wind and hydro applications by forecasting environmental conditions. The hardware components are fabricated using AI-specific tensor processing units (TPUs) for high-speed parallel computing.

In an exemplary embodiment, the one or more AI models are trained within the control unit 122 involves a multi-stage machine learning process, utilizing historical operational data, real-time sensor feedback, and predictive analytics to optimize the performance of the bidirectional rotor device 100. The one or more AI models are trained using supervised learning, unsupervised learning, and reinforcement learning techniques, depending on the specific control strategy they govern. Initially, the one or more AI models are provided with large datasets comprising rotor speed variations, load fluctuations, braking force adjustments, energy demand patterns, and environmental conditions. These datasets are preprocessed and fed into deep-learning neural networks that classify, predict, and optimize the control unit 122 responses based on historical trends. The one or more AI models are then subjected to reinforcement learning, where they interact with a simulated digital twin of the bidirectional rotor device 100, continuously refining their decision-making strategies by maximizing operational efficiency while minimizing power losses. Real-time training is further enhanced using adaptive learning frameworks, where the one or more AI models receive real-time sensor feedback from rotary encoders, torque sensors, power meters, and thermal sensors, allowing them to dynamically adjust braking intensity, power output, and speed control based on current operating conditions. Over time, the one or more AI models evolve through continuous learning and optimization, enabling the bidirectional rotor device 100 to self-adapt to varying load conditions, energy source variations, and application-specific requirements with higher accuracy, stability, and efficiency.

In an exemplary embodiment, the bidirectional rotor device 100 operates in a hybrid mode, enabling seamless transition between motor and generator functions based on real-time load demands, power requirements, and operational conditions. The hybrid mode provides dual functionality, allowing the bidirectional rotor device 100 to efficiently switch between mechanical energy output and electrical power generation, depending on operational needs.

In motor function, the first rotor 104 is configured to generate a mechanical output, while the second rotor 114 is configured to generate electric power. In the motor function, the first rotor 104 receives rotational energy from an external power source such as an electric motor, a mechanical crankshaft, or a turbine system. The rotational motion of the first rotor 104 drives the plurality of planetary gears 112, causing the second rotor 114 to rotate in the opposite direction due to the planetary gear arrangement. The relative motion between the first rotor 104 and induces electromagnetic interaction between the second rotor 114 and one of: the one or more coils, the one or more magnets, and the one or more electromagnets 118, leading to electric power generation. The generated power is then transferred to external circuits via the electric power transferring unit 110, which may include a slip ring assembly or a commutator and brush system.

In the generator function, the operational roles of the rotors are reversed, the first rotor 104 is configured to generate electric power, while the second rotor 114 is configured to generate a mechanical output. In the generator function, the second rotor 114 is driven by an external mechanical input, such as wind, water flow, or another rotating power source. The rotational energy of the second rotor 114 is transmitted through the plurality of planetary gears 112 to the first rotor 104, causing it to rotate in the opposite direction. The relative rotational motion between the first rotor 104 and the second rotor 114 generates electromagnetic induction, producing electrical power. Simultaneously, the mechanical energy of the second rotor 114 may be utilized for applications requiring rotational torque, such as pumping systems, conveyor drives, or mechanical actuators.

Figure 1E:
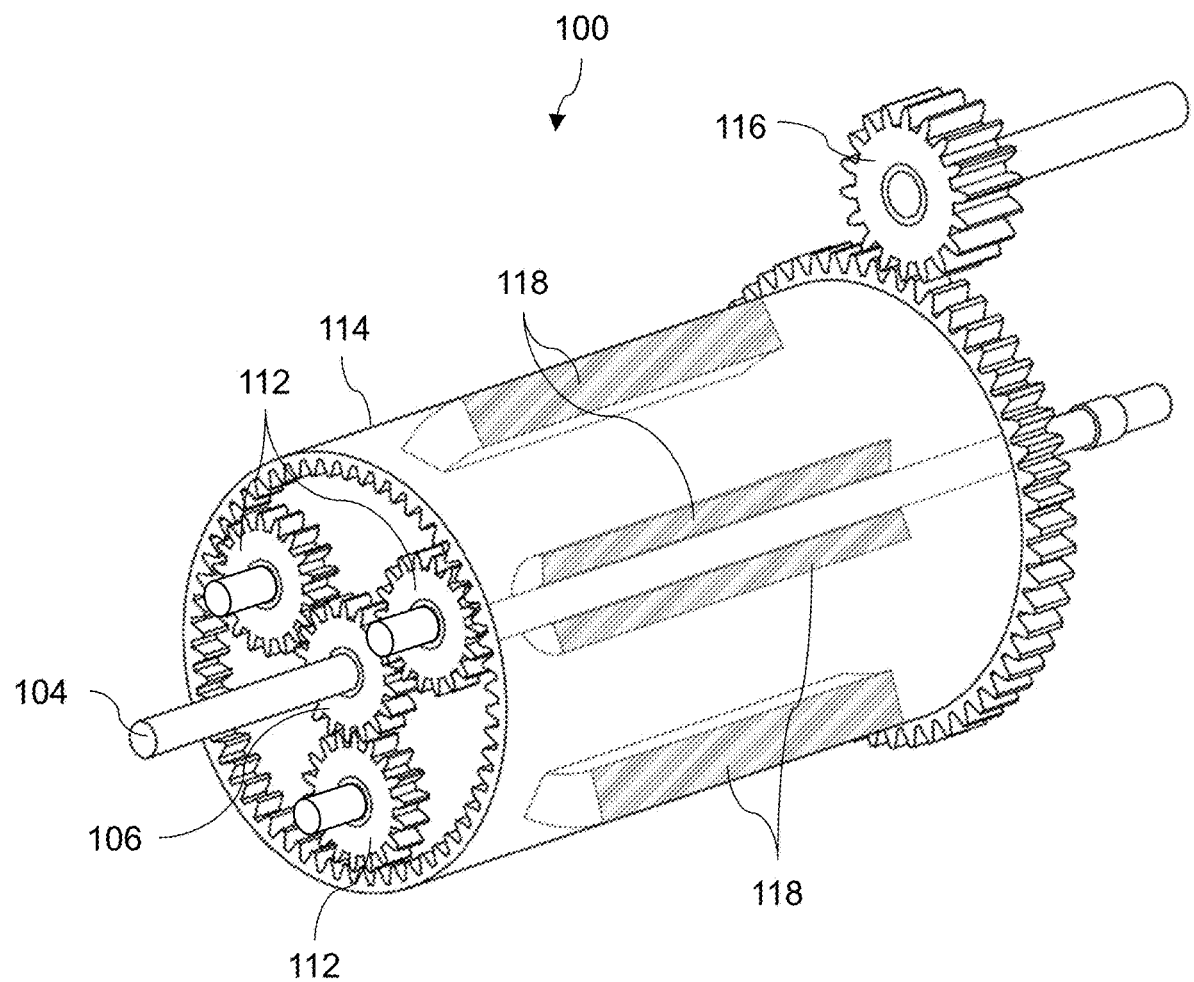
FIG. 1E illustrates another exemplary schematic isometric view of the bidirectional rotor device with three planetary gears, in accordance with an embodiment of the present disclosure.

In an exemplary embodiment, FIG. 1E illustrates another exemplary schematic isometric view of the bidirectional rotor device 100 with three planetary gears 112. Unlike previous embodiments where the plurality of planetary gears 112 comprised four planetary gears, this embodiment optimizes the mechanical configuration by utilizing only three planetary gears 112, leading to several functional and performance enhancements. By reducing the number of planetary gears 112 from four to three, the system benefits from: lower mechanical complexity, reduced parasitic losses, improved torque distribution, compact design, optimized rotational dynamics, and the like. Fewer planetary gears 112 simplify the gear train, reducing overall system weight and internal friction. Since each planetary gear 112 contributes to mechanical losses through friction and heat generation, decreasing the number of planetary gears 112 results in higher transmission efficiency. The reduction in the plurality of planetary gears 112 allows for a smaller and more lightweight bidirectional rotor device 100, making it more suitable for applications requiring higher power density in a constrained space.

Figure 1F:
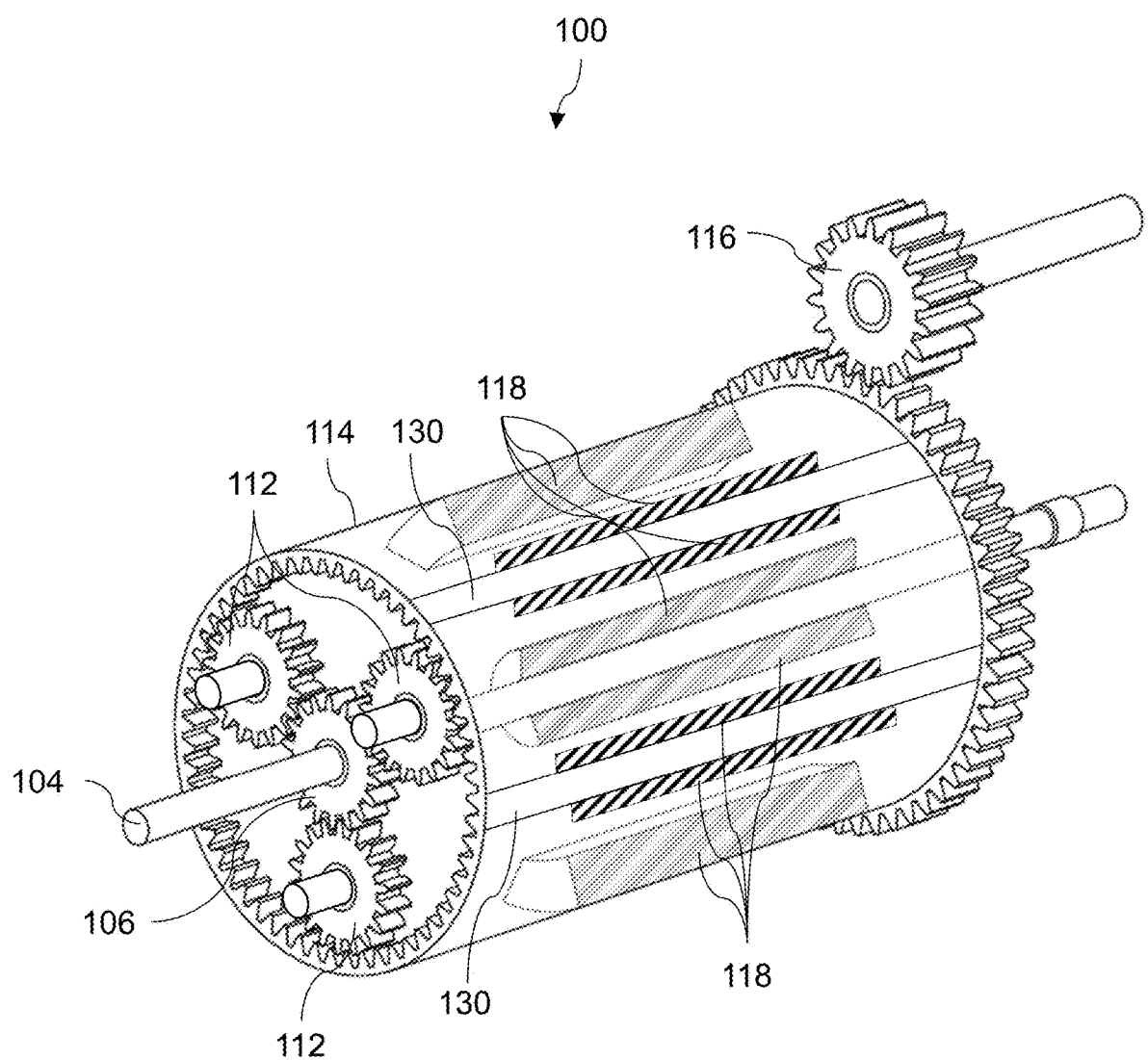
FIG. 1F illustrates another exemplary schematic isometric view of the bidirectional rotor device with one of: the one or more coils, the one or more magnets, and the one or more electromagnets on the first rotor, inside a second rotor, and a shaft associated with each of planetary gear of a plurality of planetary gears, in accordance with an embodiment of the present disclosure.

Further, FIG. 1F illustrates another exemplary schematic isometric view of the bidirectional rotor device 100 with one of: the one or more coils, the one or more magnets, and the one or more electromagnets 118 on the first rotor 104, inside the second rotor 114, and the shaft 130 associated with each planetary gear 112 of the plurality of planetary gears 112. By strategically placing one of: the one or more coils, the one or more magnets, and the one or more electromagnets 118 on each shaft 130 of the plurality of planetary gears 112, the bidirectional rotor device 100 leverages multiple electromagnetic interactions simultaneously, leading to several innovative advantages. Instead of limiting electromagnetic interactions to the first rotor 104 and the second rotor 114, integrating one of: the one or more coils, the one or more magnets, and the one or more electromagnets 118 on each shaft 130 of the planetary gears 112 creates multiple electromagnetic generation zones, leading to higher power output. The placement of one of: the one or more coils, the one or more magnets, and the one or more electromagnets 118 on the shafts 130 enhances the bidirectional rotor device 100 ability to capture rotational energy and convert it into electrical power, optimizing electromagnetic flux density. Since each planetary gear shaft 130 now participates in electromagnetic induction, power generation may occur across multiple points in the bidirectional rotor device 100, rather than being concentrated at a single rotor interface. The additional induction sites allow for dynamic power balancing, ensuring that even under variable load conditions, the bidirectional rotor device 100 maintains optimal efficiency. The distribution of electromagnetic forces across multiple shafts 130 smooths out the electromagnetic interactions, reducing cogging torque and enhancing rotational smoothness.

Figure 2:
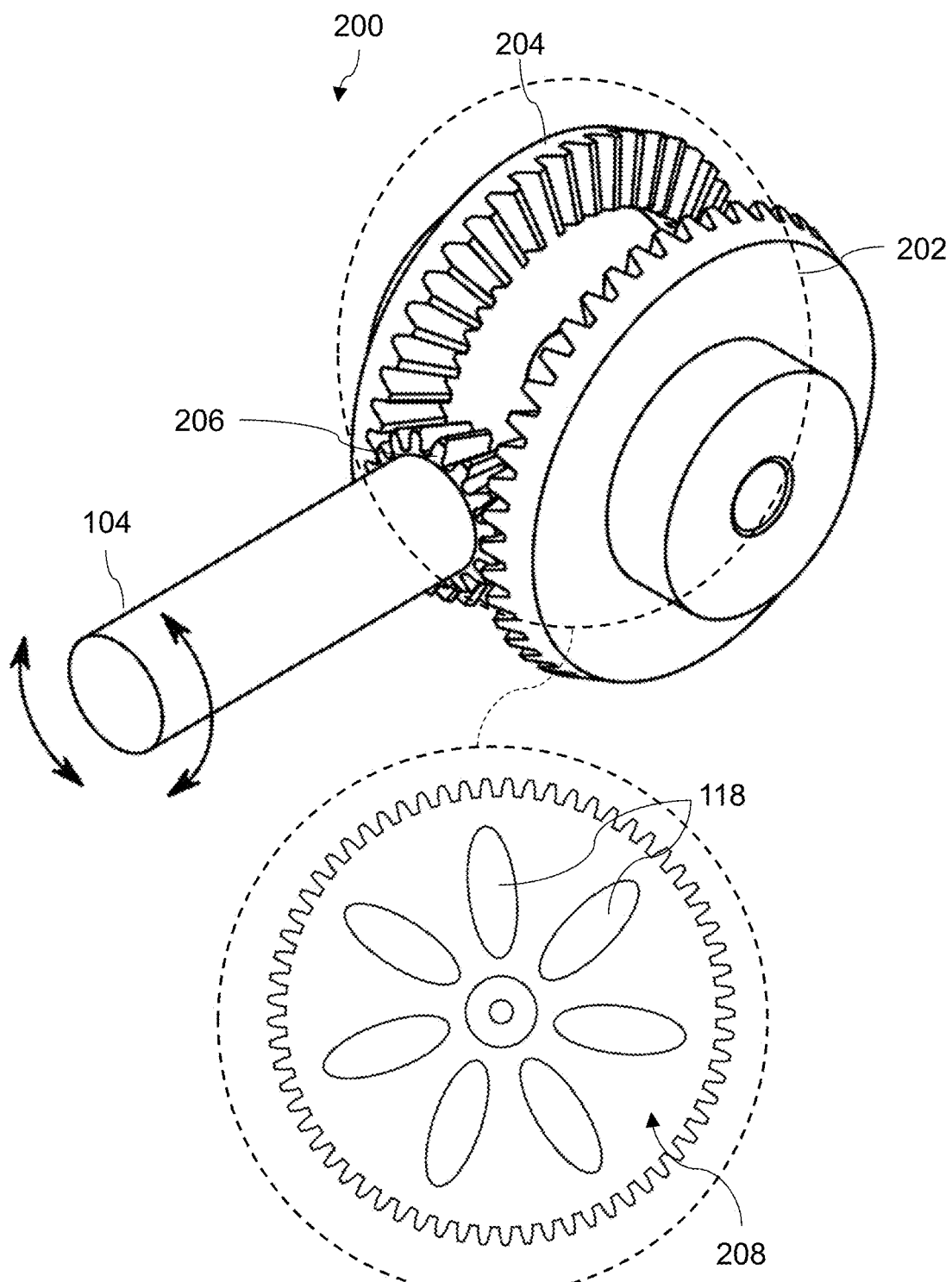
FIG. 2 illustrates another exemplary schematic isometric view of the bidirectional rotor device with bevel gear configuration, in accordance with an embodiment of the present disclosure.

FIG. 2 illustrates another exemplary schematic isometric view of the bidirectional rotor device 100 with the bevel gear configuration 200, in accordance with an embodiment of the present disclosure.

In an exemplary embodiment, the bidirectional rotor device 100 with the bevel gear configuration 200 is configured to enhance torque transfer, rotational motion efficiency, and electromagnetic interactions through the integration of a bevel gear mechanism. The bevel gear configuration 200 is engineered to ensure optimal power transmission, improve mechanical stability, and enable high-efficiency electromechanical conversion by utilizing strategically positioned one of: the one or more coils, the one or more magnets, and the one or more electromagnets 118.

The bidirectional rotor device 100 with the bevel gear configuration 200 comprises at least one of: the first rotor 104, a first crown gear 202, a second crown gear 204, a pinion bevel gear 206, and one of: the one or more coils, the one or more magnets, and the one or more electromagnets 118. The first rotor 104 is operatively connected to the pinion bevel gear 206 to rotate the first crown gear 202 and the second crown gear 204 in one of: the clockwise direction and the counterclockwise direction relative to each other. The first rotor 104 is externally connected to the input actuation unit 108 for providing rotational energy to the first rotor 104. The pinion bevel gear 206 is directly coupled with the first rotor 104, enabling torque transfer to the first crown gear 202 and the second crown gear 204. The first crown gear 202 and the second crown gear 204 rotate in opposite directions (one clockwise, the other counterclockwise), ensuring balanced load distribution and efficient energy transfer.

The first crown gear 202 and the second crown gear 204 are configured with a first surface 208. The first surface 208 is equipped with one of: the one or more coils, the one or more magnets, and the one or more electromagnets 118. One of: the one or more coils, the one or more magnets, and the one or more electromagnets 118 provides consistent power generation and optimal flux distribution. The first rotor 104 receives mechanical energy from the input actuation unit 108 (e.g., wind turbine, hydro turbine, and motor-driven system). The pinion bevel gear 206 transmits this energy to the first crown gear 202 and second crown gear 204, causing them to counter-rotate. The movement of one of: the one or more coils, the one or more magnets, and the one or more electromagnets 118 within the bidirectional rotor device 100 with the bevel gear configuration 200 induces the electric current, generating the electrical power.

Figure 3:
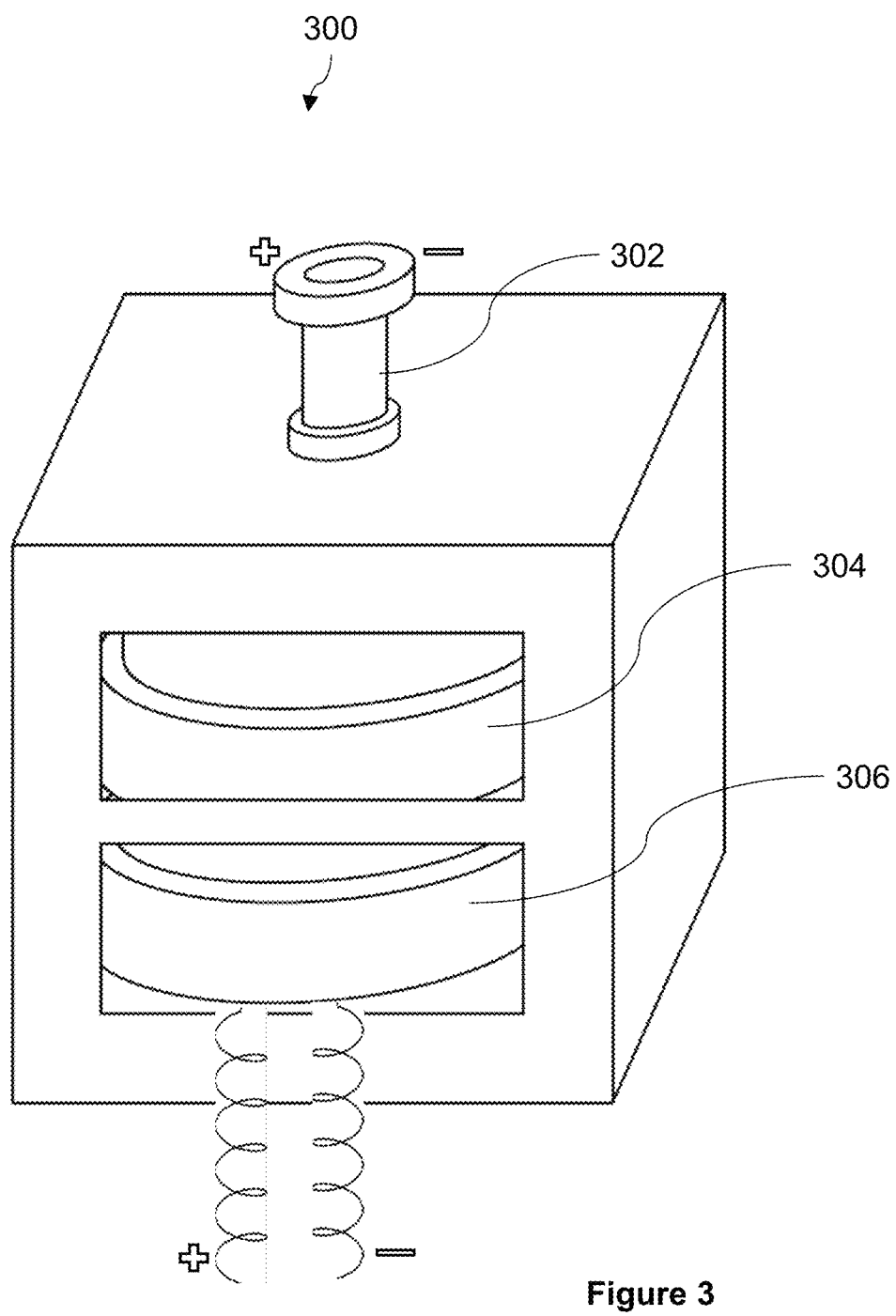
FIG. 3 illustrates an exemplary transformer unit, in accordance with an embodiment of the present disclosure.

FIG. 3 illustrates an exemplary transformer unit 300, in accordance with an embodiment of the present disclosure.

In an exemplary embodiment, the transformer unit 300 is operatively connected to the second end 126 of the first rotor 104. The transformer unit 300 comprises a copular shaft 302, a rotating coil 304, and a fixed coil 306. The transformer unit 300 is configured to facilitate contactless energy transmission by leveraging the interaction between the rotating coil 304 and the fixed coil 306, ensuring minimal mechanical wear and optimized power conversion.

In an exemplary embodiment, the copular shaft 302 is a rotationally mounted shaft that serves as the interface between the first rotor 104 and the rotating coil 304. The copular shaft 302 ensures a stable mechanical connection, allowing the transmission of rotational energy while maintaining the alignment of the electromagnetic components. The copular shaft 302 may also include conductive pathways to enhance signal integrity and power transfer efficiency.

In an exemplary embodiment, the rotating coil 304 is fixed onto the moving part of the transformer unit 300 and is mechanically coupled to the first rotor 104. As the rotor spins, the rotating coil 304 generates a varying magnetic field, which induces the electrical power in the adjacent fixed coil 306. This feature enables the conversion of mechanical rotational energy into an electrical signal, which can then be used for further processing or power transmission.

In an exemplary embodiment, the fixed coil 306 is stationary and is positioned to align with the rotating coil 304. The interaction between the fixed coil 306 and the rotating coil 304 enables inductive power transfer, ensuring wireless energy transmission without requiring direct electrical contacts. This reduces friction-related wear, enhances bidirectional rotor device 100 longevity, and improves overall efficiency.

In operation, the transformer unit 300 in the bidirectional rotor device 100 functions as a contactless energy transfer system, ensuring efficient power transmission from the first rotor 104 to external circuits or electrical subsystems. This functionality is achieved through electromagnetic induction, where the interaction between the rotating coil 304 and the adjacent fixed coil 306 facilitates power conversion and transmission without direct physical contact.

As the first rotor 104 rotates, the copular shaft 302 ensures mechanical stability and alignment of the rotating coil 304, allowing it to generate a varying magnetic field. This varying magnetic field induces an electric current in the fixed coil 306, which is stationary. The induced current is then extracted as electrical power for further processing, storage, or utilization in external systems. This mechanism ensures continuous and efficient power transfer, even in high-speed rotational applications.

One of the key advantages of the transformer unit 300 is its ability to eliminate direct electrical contacts, significantly reducing mechanical wear, friction losses, and maintenance requirements. This extends the lifespan of the bidirectional rotor device 100 and enhances its operational reliability. Additionally, the system can dynamically regulate power transfer based on rotational speed and load conditions, optimizing energy efficiency and power output stability.

Furthermore, the transformer unit 300 can be integrated with power conditioning circuits, ensuring smooth voltage regulation and minimal energy losses. This feature is particularly beneficial for applications requiring stable power supply in varying operational conditions. By leveraging inductive coupling, the transformer unit 300 provides a high-efficiency, low-maintenance solution for energy transmission, making it an essential component in the bidirectional rotor device's overall energy conversion architecture.

In another exemplary embodiment, the bidirectional rotor device 100 incorporates a stacked planetary gear mechanism, enabling simultaneous motor and generator functionality within a single system. The stacked planetary gear mechanism comprises two or more sets of planetary gear assemblies arranged concentrically along the longitudinal axis of the first rotor 104. A first planetary gear set of the two or more sets of planetary gear assemblies is operatively connected to the first rotor 104, driving it in a specific direction to perform as a motor. A second planetary gear set of the two or more sets of planetary gear assemblies, stacked above the first planetary gear set, is connected to the second rotor 114, enabling counter-rotation and facilitating generator operation.

By utilizing differential gear interactions, the stacked planetary gear mechanism optimizes the transmission of torque and rotational energy, ensuring precise speed control and energy conversion efficiency. The braking system 120 selectively engages either planetary gear set, enabling dynamic switching between motor and generator functions based on load conditions. This embodiment enhances operational flexibility, making the device ideal for applications requiring simultaneous mechanical output and electrical energy generation.

Figure 4:
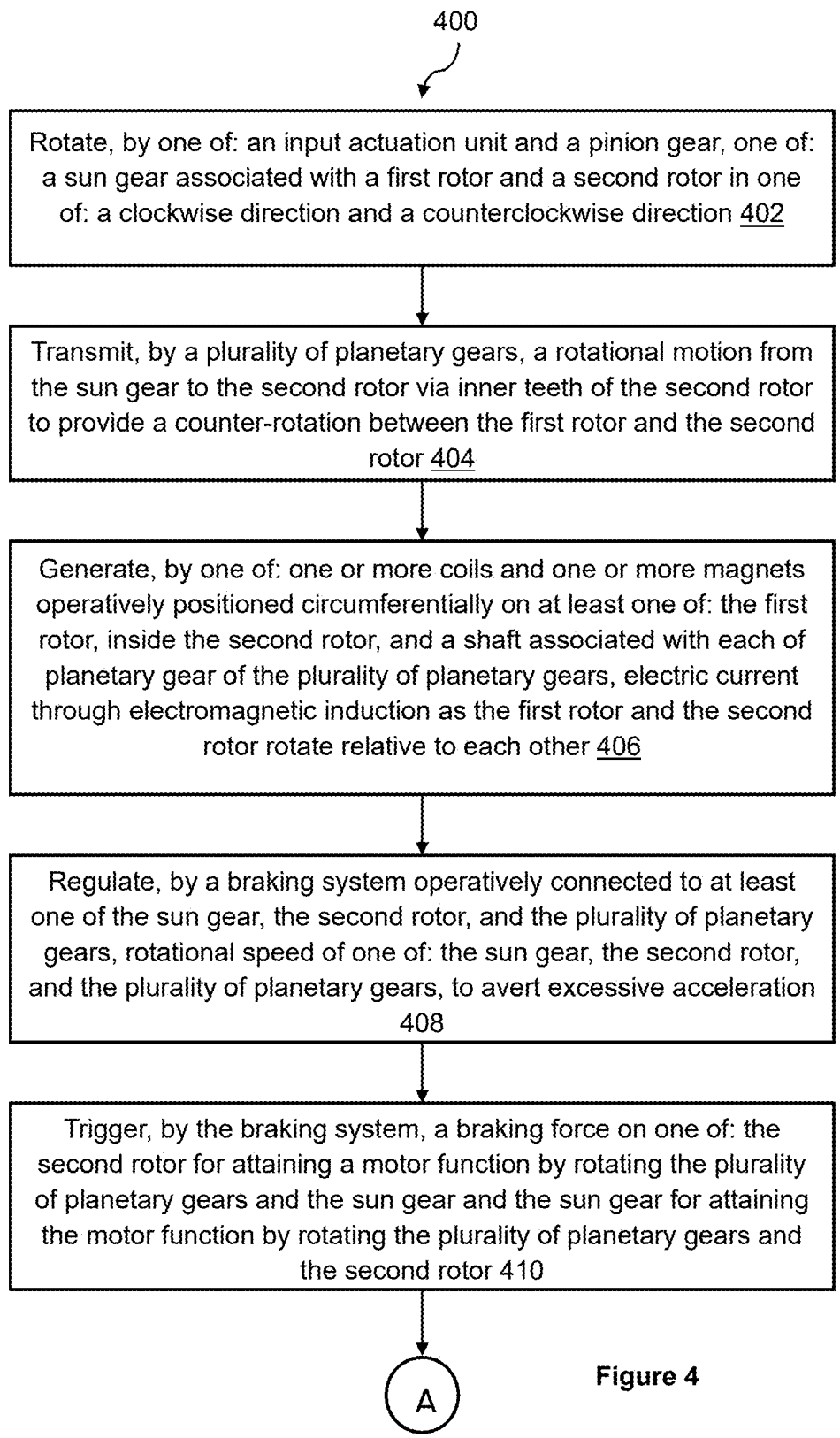
FIG. 4 illustrates an exemplary flow chart of a method for electromechanical energy conversion using the bidirectional rotor device, in accordance with an embodiment of the present disclosure.
Figure 4:
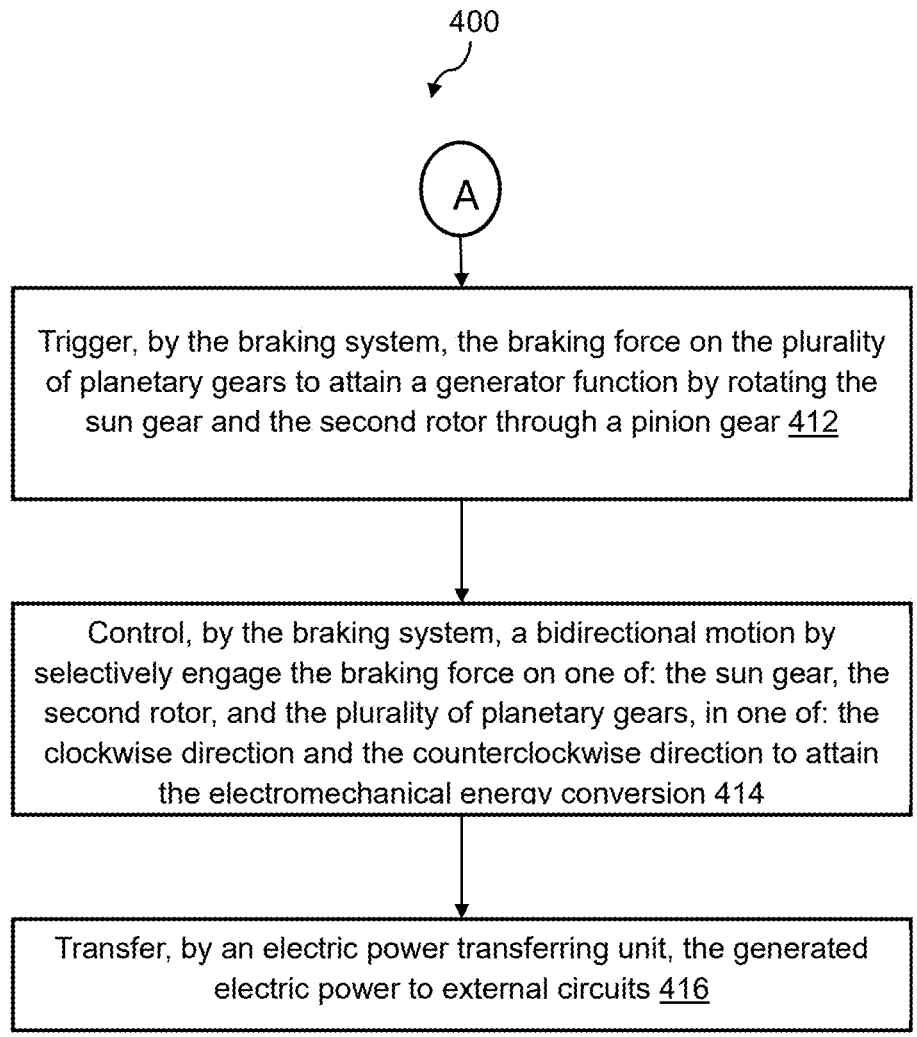

FIG. 4 illustrates an exemplary flow chart of a method 400 for electromechanical energy conversion using the bidirectional rotor device 100, in accordance with an embodiment of the present disclosure.

In another exemplary embodiment of the present disclosure, the method 400 for electromechanical energy conversion using the bidirectional rotor device 100 is disclosed. At step 402, the method 400 includes one of: the input actuation unit and the pinion gear rotates one of: the sun gear associated with the first rotor and the second rotor in one of: the clockwise direction and the counterclockwise direction. At step 404, the method 400 includes the plurality of planetary gears transmits the rotational motion from the sun gear to the second rotor via the inner teeth of the second rotor to provide the counter-rotation between the first rotor and the second rotor.

At step 406, the method 400 includes one of: the one or more coils, the one or more magnets, and the one or more electromagnets generate electric current through electromagnetic induction as the first rotor and the second rotor rotate relative to each other. At step 408, the method 400 includes the braking system regulates rotational speed of one of: the sun gear, the second rotor, and the plurality of planetary gears, to avert excessive acceleration. At step 410, the method 400 includes the braking system triggers the braking force on one of: a) the second rotor for attaining the motor function by rotating the plurality of planetary gears and the sun gear and b) the sun gear for attaining the motor function by rotating the plurality of planetary gears and the second rotor.

At step 412, the method 400 includes the braking system triggers the braking force on the plurality of planetary gears to attain the generator function by rotating the sun gear and the second rotor through the pinion gear. At step 414, the method 400 includes the braking system that controls the bidirectional motion by selectively engage the braking force on one of: the sun gear, the second rotor, and the plurality of planetary gears, in one of: the clockwise direction and the counterclockwise direction to attain the electromechanical energy conversion. At step 414, the method 400 includes the electric power transferring unit is configured to transfer the generated electric power to external circuits.

In the next step, the control unit monitors speed associated with one of the sun gear, the second rotor, and the plurality of planetary gears, load conditions, electric power requirements, energy source variations, application-specific requirements, and braking intensity in real time. In the next step, the control unit alter the braking force dynamically based on the monitored speed, the load conditions, electric power requirements, energy source variations, and application-specific requirements. In the next step, the control unit triggers the braking force through the braking system for implementing at least one of: the fault detection and the emergency shutdown to avert mechanical failure.

Numerous advantages of the present disclosure may be apparent from the discussion above. In accordance with the present disclosure, the bidirectional rotor device presents a highly efficient and versatile energy conversion mechanism, providing seamless integration between mechanical and electrical energy domains. The innovative design incorporating the plurality of planetary gears, bevel gear configurations, and electromagnetic components ensures superior torque transfer, precise load balancing, and optimized energy distribution across various operational states. These advancements make the bidirectional rotor device highly adaptable for renewable energy systems, industrial automation, electric vehicles, and power generation applications.

One of the key advantages of the present disclosure is the hybrid functionality of the bidirectional rotor device. The bidirectional rotor device able to dynamically switch between motor and generator functions allows for enhanced flexibility in energy management. By utilizing the load frequency control (LFC) model, the droop control model, and the economic load dispatch (ELD) model, the system intelligently optimizes power output, minimizes losses, and ensures stability under varying load conditions. This makes the bidirectional rotor device particularly suitable for applications where variable energy demand and intermittent power sources require efficient regulation.

Another notable advantage is the innovative use of the transformer unit, which enables contactless energy transfer between rotating and stationary components through inductive coupling. This eliminates mechanical wear and tear, reducing maintenance requirements and improving system longevity. Additionally, the integration of one of: the one or more coils, the one or more magnets, and the one or more electromagnets across the plurality of planetary gears and bevel gear configurations ensures enhanced electromagnetic interactions, maximizing energy efficiency while minimizing power dissipation.

The bidirectional rotor device allows for greater adaptability in diverse applications where the direction of the rotation may change, such as in renewable energy systems that deal with variable energy inputs. Additionally, the bidirectional rotor device is configured to reduce the mechanical stresses on components by distributing forces more evenly across both the first rotor and the second rotor, potentially increasing a lifespan and the reliability of the bidirectional rotor device. By employing the high-precision bearings, the bidirectional rotor device achieves the efficient operation without the need for the stationary stator. The bidirectional rotor device is employed in a power plant, all types of transportation such as bicycles, cars, bikes, trains, flights, and the like.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A bidirectional rotor device for electromechanical energy conversion, comprising:
    a first rotor operatively connected to a sun gear, an input actuation unit, and an electric power transferring unit,
        the input actuation unit operatively connected at a first end of the first rotor, configured to drive the first rotor in one of: a clockwise direction and a counterclockwise direction; and
        the electric power transferring unit operatively connected at a second end of the first rotor, configured to transfer electric power to external circuits;
    a second rotor comprises inner teeth and outer teeth, operatively connected to the electric power transferring unit, operatively positioned concentrically along a longitudinal axis of the first rotor, configured to rotate in a direction opposite to the first rotor;
    a plurality of planetary gears operatively positioned between the sun gear and the inner teeth of the second rotor, configured to:
        transmit a rotational motion from the sun gear to the second rotor via the inner teeth of the second rotor; and
        provide a counter-rotation between the first rotor and the second rotor;
    one of: one or more coils, one or more magnets, and one or more electromagnets operatively positioned circumferentially on at least one of: the first rotor, inside the second rotor, and a shaft associated with each planetary gear of the plurality of planetary gears, configured to generate the electric current through electromagnetic induction as the first rotor and the second rotor rotate relative to each other; and
    a braking system operatively connected to at least one of the sun gear, the second rotor, and the plurality of planetary gears, configured to:
        regulate rotational speed of one of: the sun gear, the second rotor, and the plurality of planetary gears, to avert excessive acceleration;
        trigger a braking force on one of:
            the second rotor for attaining a motor function by rotating the plurality of planetary gears and the sun gear; and
            the sun gear for attaining the motor function by rotating the plurality of planetary gears and the second rotor;
        trigger the braking force on the plurality of planetary gears for attaining a generator function by rotating the sun gear and the second rotor through a pinion gear; and
        control a bidirectional motion by selectively engaging the braking force on one of: the sun gear, the second rotor, and the plurality of planetary gears, in one of: the clockwise direction and the counterclockwise direction for attaining the electromechanical energy conversion.

2. The bidirectional rotor device of claim 1, wherein the bidirectional rotor device comprises a housing unit,
    the housing unit is configured to house and align at least one of: the first rotor, the sun gear, the second rotor, the plurality of planetary gears, the input actuation unit, and the electric power transferring unit.

3. The bidirectional rotor device of claim 1, wherein the input actuation unit comprises one of:
    a mechanical drive system comprises one of: a crankshaft and a belt-driven mechanism;
    an electric motor configured to provide rotational energy to the first rotor; and
    one of: a wind turbine system and a water turbine system for providing rotational energy to the first rotor.

4. The bidirectional rotor device of claim 1, wherein the electric power transferring unit is operatively connected to the first rotor and the second rotor, configured to transfer the electric power to the external circuits, the electric power transferring unit comprises one of:
    a slip ring assembly for continuous power transmission; and
    a commutator and brush system for converting alternating current (AC) to direct current (DC) power output.

5. The bidirectional rotor device of claim 1, wherein one of: the sun gear, the second rotor, the plurality of planetary gears, and the pinion gear are configured as one of: a spur gear, a bevel gear, a helical gear, and a double helical gear.

6. The bidirectional rotor device of claim 1, wherein one of: the one or more coils, the one or more magnets, and one or more electromagnets are operatively connected to the electric power transferring unit to:
    transfer continuous electrical power from one of: the one or more coils, the one or more magnets, and one or more electromagnets to the external circuits; and provide optimal electric power extraction by optimizing the electromagnetic interaction between one of: the first rotor, the second rotor, and the plurality of planetary gears.

7. The bidirectional rotor device of claim 1, wherein the braking system comprise at least one of: a mechanical disc, a drum brake, a hydraulic braking mechanism, a pneumatic braking mechanism, and an electromagnetic brake.

8. The bidirectional rotor device of claim 1, wherein the pinion gear operatively connected to the outer teeth of the second rotor, configured to:
    regulate speed variations of the second rotor independent of the plurality of planetary gears; and
    provide additional speed and torque transmission to assist in the generator function.

9. The bidirectional rotor device of claim 1, wherein the bidirectional rotor device operates in a hybrid mode, enabling:
    the first rotor configured to generate a mechanical output, and the second rotor configured to generate the electric power in the motor function; and
    the first rotor configured to generate the electric power, and the second rotor configured to generate the mechanical output in the generator function.

10. The bidirectional rotor device of claim 1, wherein the bidirectional rotor device comprises a control unit,
    the control unit configured to:
        monitor speed associated with one of the sun gear, the second rotor, and the plurality of planetary gears, load conditions, electric power requirements, energy source variations, application-specific requirements, and braking intensity in real time;
        alter the braking force dynamically based on the monitored speed, the load conditions, electric power requirements, energy source variations, and application-specific requirements; and
        trigger the braking force through the braking system for implementing at least one of: a fault detection and an emergency shutdown to avert mechanical failure.

11. The bidirectional rotor device of claim 10, wherein the control unit configured with one or more artificial intelligence (AI) models to identify load conditions and employ one or more control strategies for the electric power optimization,
    the one or more artificial intelligence (AI) models comprise at least one of:
        a load frequency control (LFC) model configured to maintain a stable frequency in the bidirectional rotor device based on regulating a generator output based on the load conditions in real-time;
        a droop control model configured to stabilize electric power-sharing between multiple energy sources associated with the bidirectional rotor device;
        an economic load dispatch (ELD) model configured to regulate the braking system to optimize power generation efficiency by adapting energy distribution;
        a unit commitment (UC) model configured to determine optimal scheduling of the braking system based on at least one of: the load conditions, the electric power requirements, the energy source variations, and the application-specific requirements;
        a load shedding model configured to avert at least one of: the bidirectional rotor device failure and instability, based on analyzing the load conditions of the bidirectional rotor device; and
        a predictive artificial intelligence (AI)-based load balancing model configured to forecast energy demand variations and dynamically adapt the operation of the bidirectional rotor device to optimize the electric power generation and the mechanical output.

12. A method for electromechanical energy conversion using a bidirectional rotor device, comprising:
    rotating, by one of: an input actuation unit and a pinion gear, one of: a sun gear associated with a first rotor and a second rotor in one of: a clockwise direction and a counterclockwise direction;
    transmitting, by a plurality of planetary gears, a rotational motion from the sun gear to the second rotor via inner teeth of the second rotor to provide a counter-rotation between the first rotor and the second rotor;
    generating, by one of: one or more coils, one or more magnets, and one or more electromagnets operatively positioned circumferentially on at least one of: the first rotor, inside the second rotor, and a shaft associated with each planetary gear of the plurality of planetary gears, electric current through electromagnetic induction as the first rotor and the second rotor rotate relative to each other;
    regulating, by a braking system operatively connected to at least one of the sun gear, the second rotor, and the plurality of planetary gears, rotational speed of one of: the sun gear, the second rotor, and the plurality of planetary gears, to avert excessive acceleration;
    triggering, by the braking system, a braking force on one of:
        the second rotor for attaining a motor function by rotating the plurality of planetary gears and the sun gear; and
        the sun gear for attaining the motor function by rotating the plurality of planetary gears and the second rotor;
    triggering, by the braking system, the braking force on the plurality of planetary gears to attain a generator function by rotating the sun gear and the second rotor through a pinion gear;
    controlling, by the braking system, a bidirectional motion by selectively engage the braking force on one of: the sun gear, the second rotor, and the plurality of planetary gears, in one of: the clockwise direction and the counterclockwise direction to attain the electromechanical energy conversion; and
    transferring, by an electric power transferring unit, the generated electric power to external circuits.

13. The method of claim 12, further comprising:
    housing, by a housing unit, at least one of: the first rotor, the sun gear, the second rotor, the plurality of planetary gears, the input actuation unit, and the electric power transferring unit.

14. The method of claim 12, wherein the input actuation unit comprises one of:
    a mechanical drive system comprises one of: a crankshaft and a belt-driven mechanism;
    an electric motor configured to provide rotational energy to the first rotor; and
    one of: a wind turbine system and a water turbine system for providing rotational energy to the first rotor.

15. The method of claim 12, wherein the electric power transferring unit is operatively connected to the first rotor and the second rotor, configured to transfer the electric power to the external circuits, the electric power transferring unit comprises one of:
    a slip ring assembly for continuous power transmission; and
    a commutator and brush system for converting alternating current (AC) to direct current (DC) power output.

16. The method of claim 12, wherein one of: the sun gear, the second rotor, and the plurality of planetary gears are configured as one of: a spur gear, a bevel gear, a helical gear, and a double helical gear.

17. The method of claim 12, wherein the braking system comprise at least one of: a mechanical disc, a drum brake, a hydraulic braking mechanism, a pneumatic braking mechanism, and an electromagnetic brake.

18. The method of claim 12, further comprising:
regulating, by the pinion gear, speed variations of the second rotor independent of the plurality of planetary gears; and
provide, by the pinion gear, additional speed, and torque transmission to assist in the generator function.

19. The method of claim 12, further comprising:
operating, by the bidirectional rotor device, in a hybrid mode based on enabling:
the first rotor configured to generate a mechanical output, and the second rotor configured to generate the electric power in the motor function; and
the first rotor configured to generate the electric power, and the second rotor configured to generate the mechanical output in the generator function.

20. The method of claim 12, further comprising:
monitoring, by a control unit, speed associated with one of the sun gear, the second rotor, and the plurality of planetary gears, load conditions, electric power requirements, energy source variations, application-specific requirements, and braking intensity in real time;
altering, by the control unit, the braking force dynamically based on the monitored speed, the load conditions, electric power requirements, energy source variations, and application-specific requirements; and
triggering, by the control unit, the braking force through the braking system for implementing at least one of: a fault detection and an emergency shutdown to avert mechanical failure.

\* \* \* \* \*